US011608151B2

(12) United States Patent
Rabjohn

(10) Patent No.: US 11,608,151 B2
(45) Date of Patent: Mar. 21, 2023

(54) THERMAL ENERGY POWERED EXOSKELETON CATAMARAN

(71) Applicant: Jeffrey R. Rabjohn, Gravenhurst (CA)

(72) Inventor: Jeffrey R. Rabjohn, Gravenhurst (CA)

( * ) Notice: Subject to any disclaimer, the term of this patent is extended or adjusted under 35 U.S.C. 154(b) by 241 days.

(21) Appl. No.: 17/092,571

(22) Filed: Nov. 9, 2020

(65) Prior Publication Data

US 2021/0179245 A1 Jun. 17, 2021

Related U.S. Application Data

(60) Provisional application No. 62/948,677, filed on Dec. 16, 2019.

(51) Int. Cl.
*B63H 21/17* (2006.01)
*B63B 1/20* (2006.01)
*B63J 2/04* (2006.01)

(52) U.S. Cl.
CPC ............... *B63H 21/17* (2013.01); *B63B 1/20* (2013.01); *B63J 2/04* (2013.01); *B63B 2001/206* (2013.01)

(58) Field of Classification Search
CPC ..... B63H 21/17; B63B 1/20; B63B 2001/206; B63J 2/04
See application file for complete search history.

(56) References Cited

U.S. PATENT DOCUMENTS

2008/0066393 A1\* 3/2008 Sorensen ............... E04B 1/3211
52/81.1
2020/0385093 A1\* 12/2020 Gordon, II .............. B63B 35/50

FOREIGN PATENT DOCUMENTS

JP S6323597 U \* 2/1988

\* cited by examiner

*Primary Examiner* — Stephen P Avila
(74) *Attorney, Agent, or Firm* — Perry + Currier Inc.

(57) ABSTRACT

Sun heats dark continents more than reflective oceans. Air moves onshore from high pressure to low. Creating wind: powering weather and storms—"hurricane-in-a-box-on-water" principles producing electricity in a marine vessel, providing Green Technology for Marine Transportation. Captured and recovered heat, offset by loss of heat, creates differential pressure conditions across multiple rotary engines. Night and day, a working fluid moves from high pressure to low; powering alternators, batteries, domestics, and in-hull electric drive trains, in a unique, lightweight exoskeleton dome shell design vessel. Disclosed vessel design advantages include: high energy collection and living space to vessel length ratio; high strength to weight ratio; high carrying capacity, downwind sailing while producing electricity; modular fabrication and shipping; and sustained hull speed in a vessel harvesting energy from the environment. The longer the vessel: the more it carries: the greater the hull speed: the faster it goes.

19 Claims, 15 Drawing Sheets

THERMAL ENERGY POWERED EXOSKELETON CATAMARAN

CROSS-REFERENCE TO RELATED APPLICATIONS

This application claims the benefit of the U.S. 62/948,677, filed Dec. 16, 2019, the entirety of which is incorporated herein by reference.

FIELD

The present disclosure relates to renewable and green energy technologies and power plants; exoskeleton, dome, or icosahedron aquatic vessel design; marine transportation or housing; or environmental energy extraction.

BACKGROUND

One great challenge facing aquatic vessels harvesting energy from the environment is maintaining cruising speed—maintaining a fast speed over distance, while the boat sits level in its stern and bow waves.

The greatest challenge facing aquatic vessels harvesting energy from the environment is maintaining hull speed—maintaining the fastest speed the boat can attain before having to climb up its own bow wave.

Sailing vessels dependent on the wind lose hull and cruising speed when ample wind is not available.

Similarly, solar powered vessels dependent on the sun lose hull and cruising speed when enough sun is not available, and at night.

Lack of usable space is also a challenge facing aquatic vessels harvesting energy from the environment. Sails, rigging, and solar panels take up living and storage space.

Further, sails and rigging and their supports, and solar panels; add weight to the vessel, increasing drag on the water, lowering carrying capacity, requiring more energy to maintain cruising or hull speed.

Hazardous materials are used to manufacture solar cells.

Transport of sailing and solar panel vessels across land is difficult.

Problems and costs associated with aquatic vessels powered by non-renewable fuels (e.g., diesel, gasoline) are well known. These include high initial cost, ongoing fuel costs, ongoing operating repair costs, environmental pollution, noise, exhaust, risk of fire, and potentially long distances between locations where refuelling is possible—vessels dependent on fossil fuels lose hull and cruising speed when refuelling is not possible.

SUMMARY

Problems involved in the prior art which are solved by this applicant's invention include: the ability to maintain hull speed in an aquatic vessel harvesting energy from the environment—in the absence of wind, or sun, or at night—while providing for domestics, such as refrigeration, hot water, air conditioning and heat; the ability to sail downwind—without carrying sails or rigging—while harvesting and storing thermal energy; the ability to collect rainwater; the ability to provide ample living and storage space—without imposing on energy collection; ability to integrate emerging green technologies; exceptionally low environmental impact; ease of manufacture and transport across land. Longevity. Low risk of fire. Exceptionally low operating costs. Low noise. No exhaust—powered by energy easily and freely obtained from the environment.

Consider. The sun shining on this planet causes cooler air positioned above the highly reflective oceans to move onshore to replace warmer air rising above heat absorbing land masses. In short, sun causes wind. Air moves from high pressure to low. Secondly, water conducts heat 20 times faster than air. And third, the ideal gas law ($PV=nrT$). These principles power the weather and storms on Earth. The disclosed catamaran exploits these same "hurricane-in-a-box-on-water" principles to sustain hull speed in an aquatic vessel harvesting energy from the environment.

The disclosed vessel includes a plurality of hulls (Vakas) and a bridge joining them (Aka); supporting an exoskeleton dome, dual-walled, geodesic, shell, or otherwise.

The dome, or dual-walled dome, provides light weight structural integrity for the vessel's superstructure, The outer dome wall also provides protection from the elements.

The outer dome wall may also collect rainwater in channels between modules.

Rainwater collection does not interfere with living space, thermal energy collection, or sailing.

The light weight inner dome wall defines an open concept, high ceiling, and high volume living space.

When sailing downwind, with back doors open, the inner dome living space also acts as sail surface.

Sailing does not interfere with living space, thermal energy collection, or rainwater collection.

The dual wall exoskeleton dome may be in the shape of an icosahedrons or truncated icosahedrons formed from angled modules; which may have different perimeter shapes, such as hexagonal, pentagonal or triangular; to conform to the chosen geodesic dome geometry.

Modules can provide different functions; such as access, or storage, sail surface, electricity production, or provide a combination of functions.

Modules folded out from the outer dome, may act to increase sail surface area, downwind or crosswind, and may act to control downwind or crosswind sailing.

Modules folded out from the outer dome, may also act as loading ramps and doors, modes of egress, storage lockers.

Most modules can produce electricity. Most modules can produce electricity utilizing enclosed parabolic collectors.

Capturing thermal energy and converting it to electricity does not interfere with living space, rainwater collection, or sailing.

Captured thermal energy is converted into electrical energy in the following five ways:

First, in multiple electricity-generating (primary) modules, a plurality of modular heat collectors and traps repeatedly focus, concentrate, and accumulate incident, reflected, and absorbed heat harvested from the environment through transparent outer dome module panels, under greenhouse conditions. The harvested heat is used to increase gas pressure and temperature in a conduit where gas enters a module's rotary engine, driving an in-module alternator, charging batteries.

Second, cold refrigerant wrapped around exhaust chambers of in-module rotary engines cools/condenses the gas coming out of each engine. Heat loss is used to decrease gas pressure and temperature where gas moves out of the rotary engine through the exhaust chamber, furthering differential pressure and temperature conditions across the in-module rotary engine; driving its alternator, charging batteries.

This may also occur even when no appreciable heat is captured. At night, or when heat input is otherwise low, cooling at the exhaust of a rotary engine may also provide enough differential pressure conditions to run the engine and generate power. In a vessel on tropical seas, this typically occurs both night and day.

An example primary module, as disclosed herein, is a sealed heat collector that includes a frame defining a volume, a liquid volume at the frame, a gas conduit and a plurality of mirrors to concentrate thermal energy into heat sinks and into the gas conduit. The gas conduit is located within the volume to thermally interact with the liquid volume. Expanding gas moves through the gas conduit through the rotary engines to convert thermal energy into electrical energy.

Further, a dual-fluid heat loop apparatus, as disclosed herein, includes a closed liquid loop including a first heat exchanging element, and a closed gas loop including a second heat exchanging element and a heat collector. The first heat exchanging element and the second heat exchanging element are in thermal communication. The dual-fluid heat loop apparatus further includes a rotary engine, wherein the heat collector is to collect heat from an environment to provide collected heat to the gas loop to drive the engine. Electrical power may then be extracted from the mechanical motion of the engine.

Third, glycol or the hot water supply is stored in hollow perimeter-defining members of modules and may act as a heat sink. For example, during the day, the heat acting on the gas within a module (the first way above) may dominate. Excess heat, which could otherwise be wasted, may be stored in the glycol or heated water in the module's perimeter member. Then, at night, when environmental heat collection through the gas no longer dominates, heat may be extracted from the liquid/gas in the perimeter module member and warm the gas to run the primary engine. Or alternatively, heat in a storage tank from the liquid gas module member may be pumped through a separate closed loop, to directly power storage rotary engines driving their alternators, charging batteries. Heat directly absorbed by the module members, or rainwater heat not used for domestics, may also be converted to electricity by this method.

Forth, heat created by the battery banks and electric drive motors located in the hulls is recovered. A refrigerant conduit wraps the electric motors and their battery banks to collect waste heat and deliver heat as expanding gas through another set of in-hull recovery rotary engines, driving their alternators, charging batteries.

Fifth, cold refrigerant, aided by the coding sea, wrapped around exhaust chambers of battery bank and electric drive motors cools/condense the gas exiting recovery rotary engines, furthering differential pressure and temperature conditions across the in-hull recover rotary engines; driving their alternators, charging batteries.

In general, captured heat—collected, stored, recovered, absorbed—increases pressure and temperature of a working fluid where it enters a rotary engine, driving alternators, charging batteries. Odd refrigerant wrapped around exhaust chambers decreases pressure and temperature of a working fluid where it exits a rotary engine, driving alternators, charging batteries. The working fluid may be air or other gas or glycol or other liquid. An electric motor is each hull then provides motive power to the vessel.

Note, the volume of working fluid in the collection loop, rotary engine, exhaust chamber, and heat sink may be mathematically related in accord with Rumford Fireplace rules, so gas draws from collection loop to engine compression chamber to exhaust chamber to heat sink.

Mechanisms are in place to vent excess pressure in closed module systems.

Mechanisms are in place to collect condensation in closed module systems.

The dual-walled exoskeleton dome design facilitates high superstructure strength to weight ratio. Spans are short. Less, and lighter materials support the vessel above the waterline. Exoskeleton dome design saves weight.

Modular integration also saves weight. Modules capturing thermal energy, or wind, or both; while providing structural integrity, living space, carrying capacity, and energy conversion.

Both exoskeleton dome design and modular integration increase carrying capacity and lower the amount of energy required to maintain hull speed by lowering the size and amplitude of the bow and stern waves, and lowering vehicle resistance on the water.

In quintessence, in a vessel which requires less energy to maintain hull speed, thermal energy collection surface area, together with sail surface area, together with vessel surface area acting as a heat pump; sum so energy harnessed exceeds energy required to maintain hull speed in a vessel harvesting energy from the environment.

Excess energy stored in batteries can be sold.

The present invention may be used for pleasure boat, ferry, live-a-board dive boat, cruise ship, shuttle, guided tour boat, mobile stage, mobile café, mobile restaurant, yacht, research vessel, covered or refrigerated transport, mobile battery recharging station, mobile fire station, mobile Medic first aid, Paramedic-on-the-water—mobility or housing on water; and may be readily scaled up for cargo and transport operations.

DETAILED DESCRIPTION

This disclosure provides an aquatic vessel which sustains hull speed powered by energy it harvests from the environment.

Aquatic vessels are buoyant because they displace more water than they weigh. When they move, they push against the water, putting up a wave at the bow. When they move, they also drag on the water, pulling up a wave at the stern. When the wavelength of the bow wave is equal to the length of the wetted surface of the boat at the waterline, the boat has reached hull speed. Hull speed is the fastest speed the boat can attain before having to climb up its own bow wave. Cruising speed is maintained while the boat sits level in its bow and stern waves.

Hull speed is directly related to the length of wetted surface of the vessel at the waterline. That length; and therefore, hull speed, is greater for a multi-hulled vessel than a mono-hulled vessel—two hulls have a longer wetted surface than one. Or alternately, for a boat of a given length, it requires less energy to sustain hull speed in a multi-hull vessel than a mono-hulled (single hull) vessel. Therefore, a multi-hulled vessel is presented here.

Wetted length and hull speed are directly related to the amplitude of the bow and stern waves the boat sits between. For a boat of a given length and displacement, the less the boat weighs, the less the wave amplitude, the less energy required to sustain hull speed. Therefore, this disclosure presents a multi-hulled vessel of exoskeleton design that weighs less.

As a preliminary matter, a gas may be atmospheric air in composition, it may hold moisture, or it may be another gas, vapor or the like. Similarly, water is used herein to denote fresh water, rainwater, sea water, a mix of water and glycol, or a mix of water and another liquid. Thus, a working gas may be any suitable gas with or without moisture content, and water may be taken to mean any liquid that includes some water.

Figure 1:
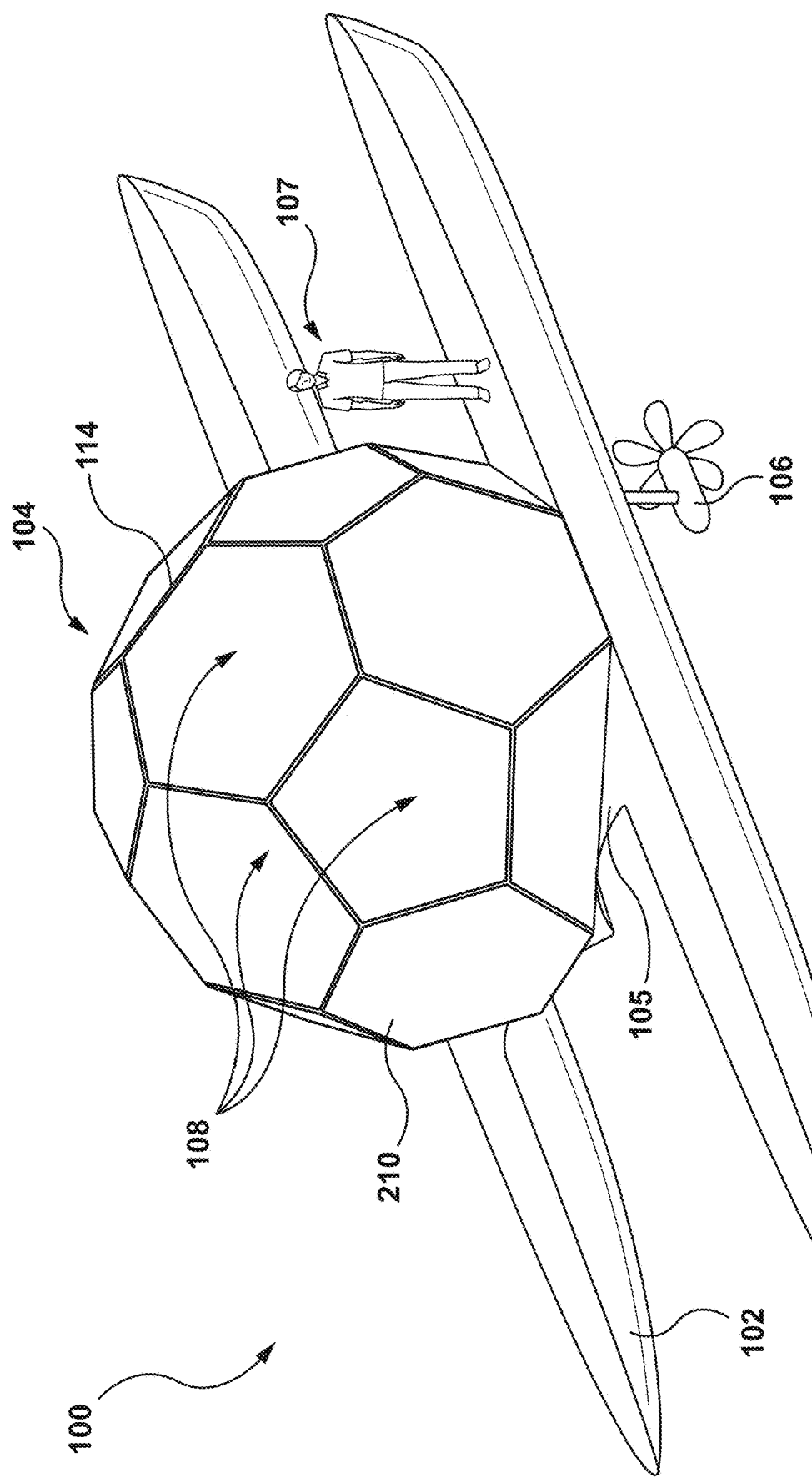
FIG. 1 depicts a perspective view of an example catamaran.
Figure 2:
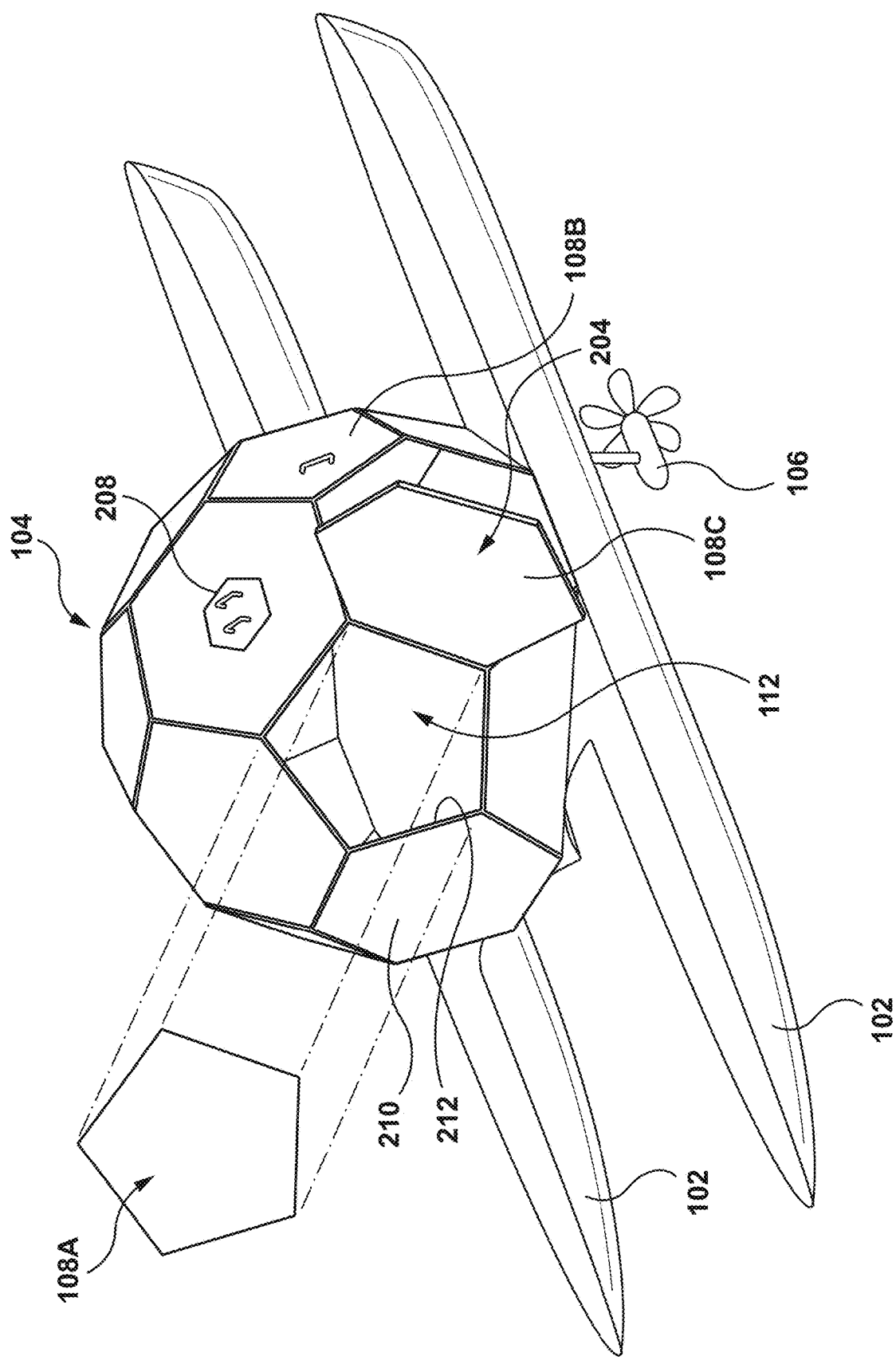
FIG. 2 depicts another perspective view of the example catamaran of FIG. 1 with additional features

Referring to FIGS. 1, 2, a vessel 100 is shown generally. The vessel 100 includes a dual-walled modular dome 104 supported on the plurality of hulls 102 (Vakas) that are joined by a bridge 105 (Aka). An electric motor with a propeller 106 is provided to each hull 102 to provide motive power to the vessel 100.

FIG. 1. The outer walls 210 in combination with structural frame members of the dome modules 108 collectively provide an exoskeleton for the vessel 100. An exoskeleton may provide rigidity and structural integrity, and protection from the elements, to the vessel 100.

FIG. 1. Each dome module 108 may have a planar structure with a perimeter in the shape of a pentagon or hexagon. The planar structure of the dome modules 108 allows same perimeter shape modules to be easily stacked after production or during storage periods thereby saving much space.

FIG. 1. The dome modules 108 may be arranged in a truncated icosahedrons pattern that ultimately defines the dome 104. The arrangement of dome modules 108 may therefore create a dome-like surface, in the same manner that a soccer-ball is formed from joined hexagonal and pentagonal elements. Further, the dome modules 108 may be replaced with relative ease due to their modularity and structural integrity maintenance of the dome 104 when the dome modules 108 are connected to each other.

Figure 15:
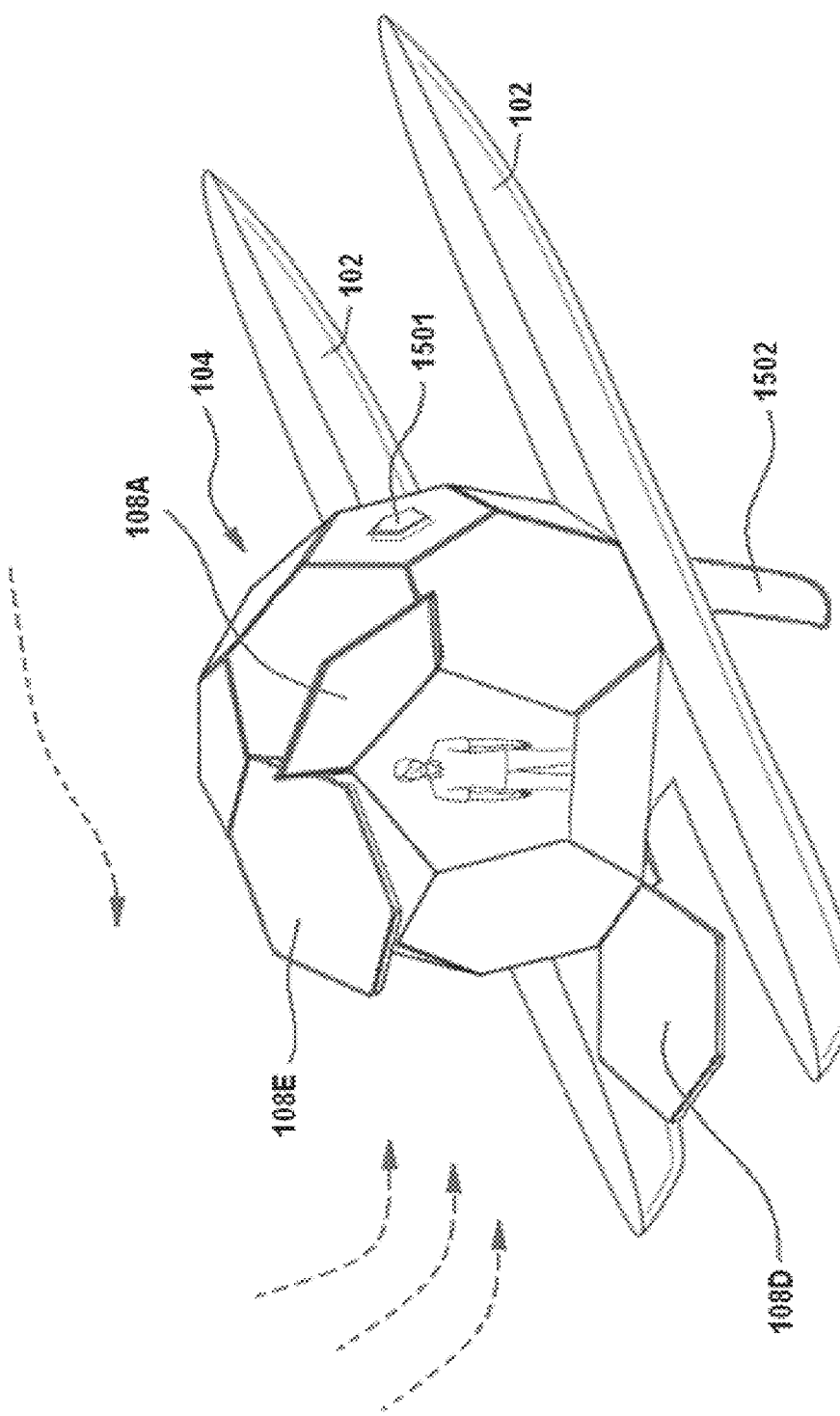
FIG. 15 depicts a perspective view of an example catamaran (FIG. 1) with additional features when sailing downwind.

FIGS. 1, 2, 15. The dome 104 as formed by modules 108 may be considered an exoskeleton that provides a degree of rigidity to the vessel 100 against the forces of the sea transmitted through the hulls 102. Due to its approximately hemispherical shape, the dome 104 further provides a streamlined profile against the wind, so that the wind does not undesirably influence navigation, while providing the ability to capture the wind when travelling downwind. The dome 104 may also provide lift when sailing, granting the vessel 100 speeds in excess of hull speed.

Addendum. Each hull is 0.125 to 0.175 as wide at the waterline as the hulls are long, and the ratio of waterline length to hull center-to-center distance, is between 2.0 and 2.4, which has been found to be most effective when balancing vessel lateral and longitudinal stability. Narrow hulls closer together go faster, but the vessel is more inclined to roll in exceptionally rough seas. Wide hulls farther apart carry n ore, but the vessel is more inclined to flip end over end in exceptionally rough seas.

FIGS. 1, 2, 15. A dome module 108 may provide functionality other than heat collection, such as storage, physical access (e.g., a door or hatch), ventilation, and sail surface.

FIG. 2. The dual-walled modular dome 104 may be formed from an assembly of modules 108. Each module may include an inner wall 212 and an outer wall 210. In each module 108, the space between inner and transparent outer walls 212, 210 may contain modular heat collectors to capture heat from the environment, and a rotary engine and alternator to convert thermal energy into electrical energy, used to drive the propellers 106 to move the vessel 100 and provide for domestic services on the vessel 100. Batteries may be provided to store electrical power generated.

Referring to FIG. 2, a dome module 108A may be removable with respect to the dome 104 without affecting the structural integrity of the dome 104. Spare dome modules 108 or dome modules 108 with different or enhanced functionality may also easily be stored on the vessel 100.

FIG. 2. The inner walls 212 of the dome modules 108 collectively create an interior living space for the vessel 100. The inner dome of the vessel may have a radius of 1.5 times the height of a human 107.

FIG. 2. A dome module 108 may include a hatch 208 to provide fresh air, egress, or release excess heat from inside the dome 104.

FIG. 2. A dome module 108B may be hinged to an adjacent module or aka deck to act as a door to allow access to the interior space 112.

FIG. 2, 15. A dome module 108D, 108A, may be hinged to an adjacent module to allow the module to be moveable with respect to the dome 104 to extend outwards from the surface of the dome 104 to provide sail surface.

Referring to FIG. 15, with aft (rear) modules 108D, 108E open, the inner dome becomes a sail, permitting the vessel to sail downwind. Modules (108A or 108C) folded out to face the wind, may be operated by 3 dimensional hydraulics, increase sail surface area. Inner module hatches 1501 fore (up front), may be used to vent excess wind. Dagger boards 1502, which may be raised when not in use, may be used to aid stability. Aft facing modules near the top of the dome 108E may be used as a spoiler, to aid stability when sailing downwind.

With ref to FIG. 1, 2, 7, the vessel 100 may further include flexible connector membranes 114 to provide fluid-barrier connections among the outer walls 210 of the modules 108. The flexible connector membranes 114 may vary in shape, size and material, typically however being formed of a flexible and water resistant or waterproof material so as to prevent rain or other sources of water from making its way inside the dome 104; even where they hinge to provide access.

Figure 7:
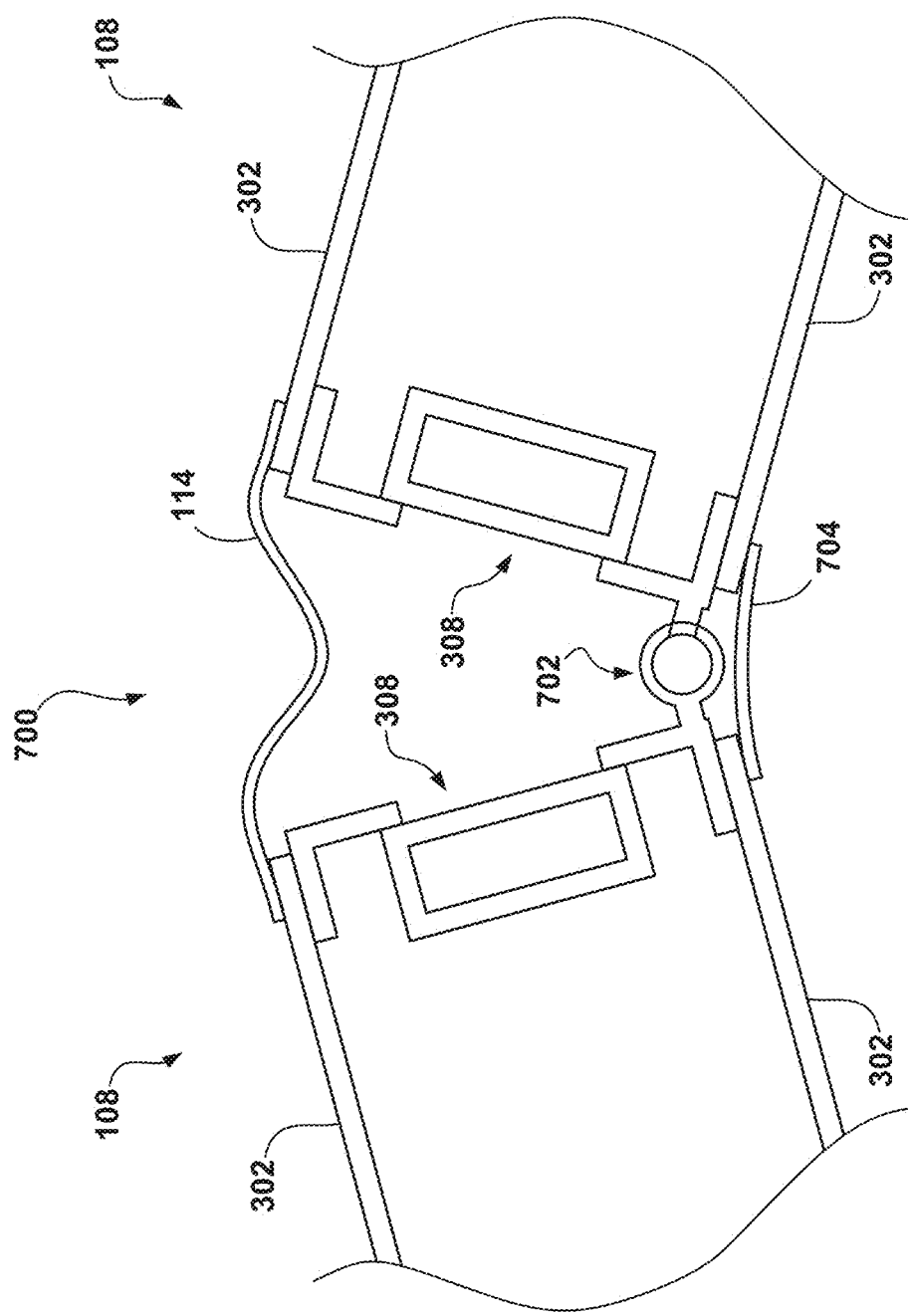
FIG. 7 depicts an example joint used to connect a plurality of the example sealed modular heat collectors of FIG. 3 and FIG. 4.

As shown in FIG. 7, the flexible connector members 114 between dome modules 108 may act as localized troughs that are concave with respect to the generally convex dome 104, The flexible connector members 114 may allow rainwater that impinges on the dome 104 to be collected and stored for later use.

FIG. 7. The dome modules 108 may have hinged connections 702 to form the overall structure of the dome 104. An inner edge of each unit or collector module 108 may also securely connect to a hull 102, bridge 105, or deck of the vessel 100. Note that, in FIGS. 1 and 2, the deck is inside the dome 104.

Figure 13:
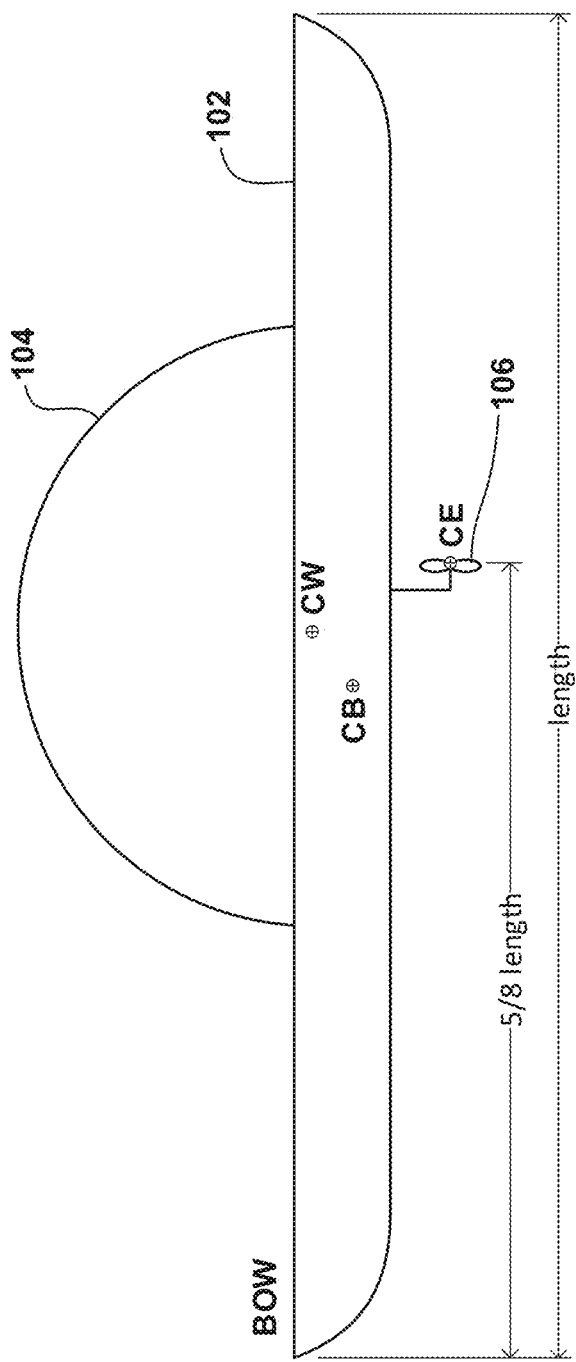
FIG. 13 is a side schematic view of an example catamaran.

With reference to FIG. 13, each propeller 106 may be located at about ⅝ths of hull waterline length, as measured from the bow (front). This has been found by mathematical equation to be an effective point of application for forward thrust, as may be termed the center of effort CE. CE is located where the vessel is inclined to stay level between bow and stern waves. The center of the dome 104 may be located along the hull length between the centre of effort CE and center of buoyancy CB to establish the center of weight CW, where it just provides lift at the bow, in an effort to cheat (excel) hull speed.

Addendum to FIG. 13. The batteries used to store electrical generated as discussed herein act as ballast for the vessel 100. A battery may be positioned to help balance center of weight OW to centre of buoyancy CB and center of effort CE.

Figure 3:
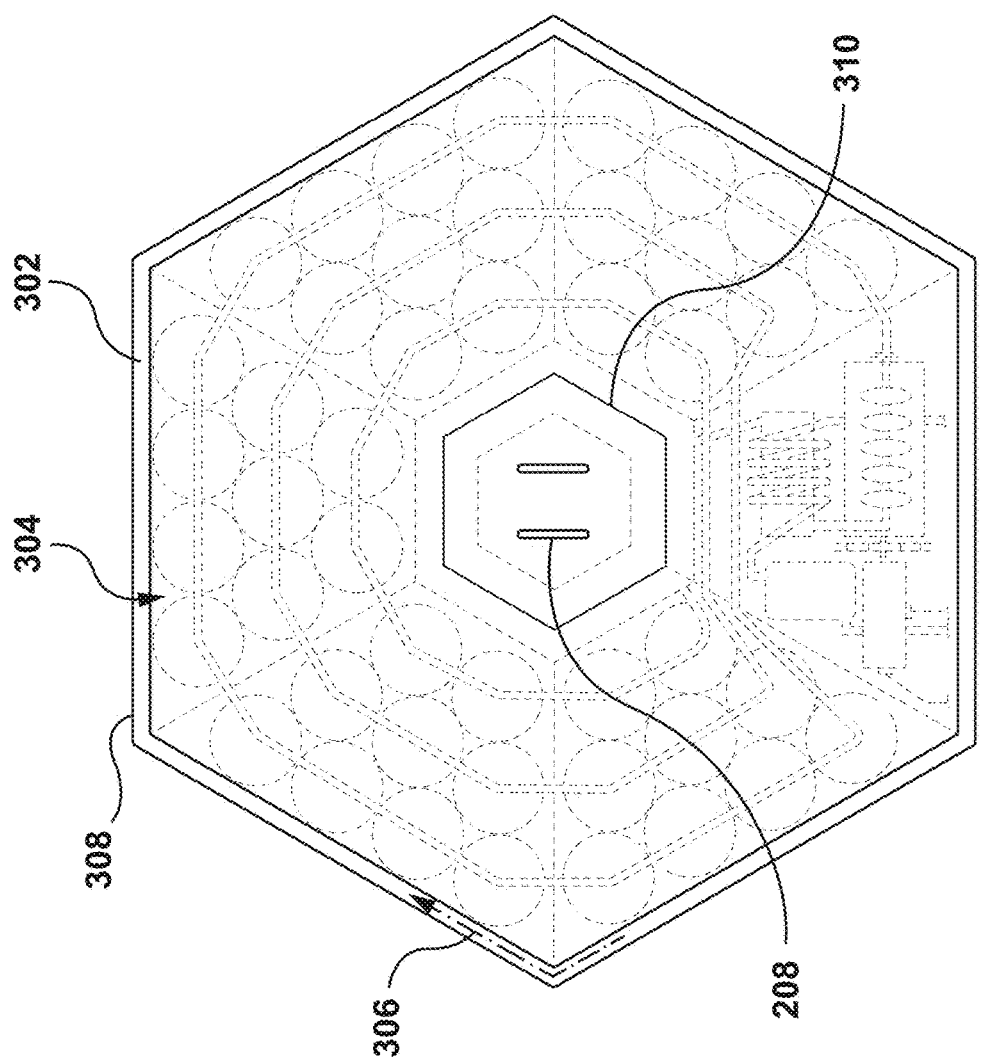
FIG. 3 depicts a perspective view of an example hexagonal sealed modular heat collector.

Referring to FIG. 3, a sealed dome module 108 containing a modular heat collection system is shown generally. The sealed heat collector module 108 includes a frame 308 defining an interior gas volume 304 in the frame 308, and a liquid volume 306 within members of the frame through which water or similar liquid may be stored and/or made to flow at the frame 308, That is, the module 108 may be made of structural members that form the frame 308 and some or all of those members may be hollow to allow the containment and flow of liquid. At the same time, the interior volume bounded by the frame 308 may be used to contain gas, such as air.

The frame 308 may have a planar structure with a perimeter shaped as a hexagon. The frame 308 may be made of aluminum or a similar lightweight material. The frame 308 may further include connectors, hinges, or other attachment structure to allow for easy removal and substitution of the module 108.

The module 108 may further include opposing inner and transparent outer panels 302 (see also FIGS. 6 and 7) to cooperate with the frame 308 to seal the interior volume 304 from the environment. The opposing panels 302 may be quadrilateral in shape and may be made from polycarbonate, or multi-celled polycarbonate, or a similar transparent/translucent, strong, and lightweight material. The opposing panels 302 may be fixed in place by fasteners (see FIG. 14) that resist electrolysis/corrosion and may be replaceable.

The sealed heat collector module 108 may further comprise a hatch 208 to release the excess heat from a particular sealed heat collector module 108. The hatch 208 may be attached to an inner frame 310 with a hinge, or it may be fit in place and able to be pulled out of the inner frame 310.

Figure 4:
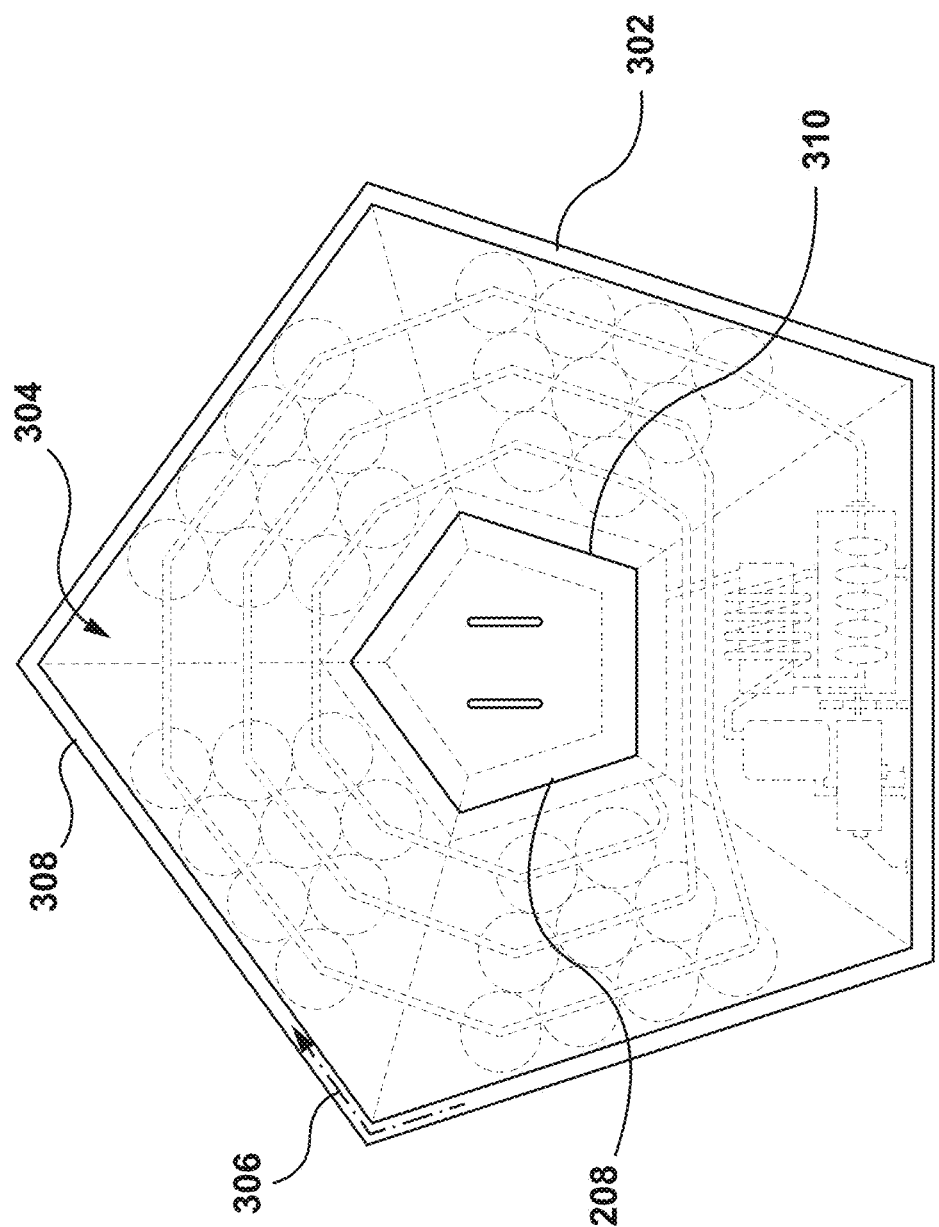
FIG. 4 depicts a perspective view of an example pentagonal sealed modular heat collector.

Referring to FIG. 4, a frame 408 may comprise a planar structure with a perimeter shaped as a pentagon. This enables the pentagonal dome modules 108 to be arranged with the hexagonal dome modules 108 in an icosahedron dome structure. The planar structure of the dome modules 108 may allow for dome modules 108 with a pentagonal perimeter shape to be easily stacked together after production, during transport, or during storage periods thereby saving much space.

The dome modules 108 that are shaped as pentagons may possess substantially the same internal components, functional characteristics or features as those sealed heat collector modules 108 shaped as hexagons. Hexagons and pentagons are just several example module shapes and, in other examples, other shapes may be used.

Figure 5:
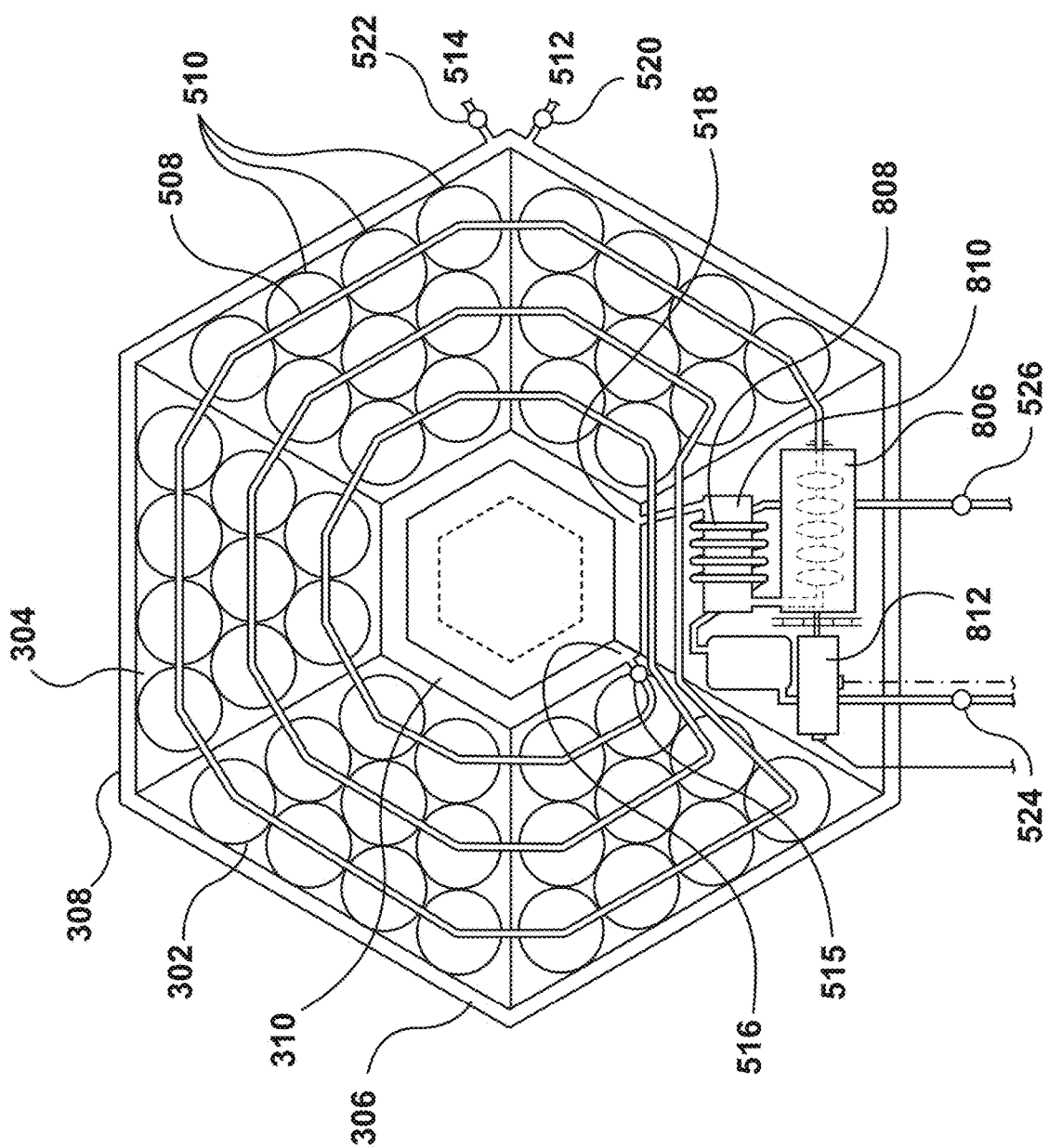
FIG. 5 depicts a perspective view of the inside of the example hexagonal sealed modular heat collector of FIG. 3.

Referring now to FIG. 5, a sealed heat collector module 108 includes a gas conduit 508 and a plurality of mirrors 510 to concentrate thermal energy onto the gas conduit 508. The gas conduit 508 may include an inlet 516 for gas to enter the gas conduit 508 and an outlet 518 for gas to leave the gas conduit 508. The inlet 516 and outlet 518 may be connected to the inner frame 310, which may include a hollow member that defines a gas volume. The gas conduit 508 may include a one-way valve 515 located at a suitable position along its length. As such, gas may flow in a closed loop through the gas conduit 508 from the inner frame 310, past the mirrors 510, to an engine 806 that is driven by the gas, and then back to the inner frame 310.

The engine 806 may be provided in the heat collector module 108 and may operate to convert gas heated by energy collected by the mirrors 510 into mechanical energy. The engine 806 is connected to an exhaust chamber 810 to receive fluid outputted from the engine 806. The exhaust chamber 810 may be cooled by a liquid coil 808. The engine 806 is further connected to an alternator 812 to generate electrical power from rotation of the engine 806. The engine 806 may be a rotary engine, such as that shown in FIG. 12.

The mirrors 510 are to collect solar energy and concentrate it at the gas conduit 508, or heat sinks along the conduit. As such, the mirrors 510 should be as large as practical to permit optimum collection surface area, and to permit transfer of heat to water or glycol filled hollow perimeter frame members. The mirrors 510 may be parabolic. Parabolic mirrors are very effective at concentrating solar thermal energy to a focussed point. The mirrors 510, and any parabolic mirrors, may be made of any sturdy material suitable for reflecting light or solar thermal energy, such as a polished metal (e.g., stainless steel), metallized plastic, or similar.

Metal components within the module, such as the mirrors 510, frames 308, 318, and so on, may be in physical contact so as to conduct thermal energy to a desired location, heat sink, or heat storage.

A portion of the gas conduit 508 within the volume 304 may be shaped as a spiral. This spiral configuration provides the advantage of the gas in the gas conduit 508 being heated over a relatively long distance despite the sealed heat collector module 108 being relatively compact in size. Restrictions in the conduit force the gas through a small opening, increasing pressure and temperature.

A sealed heat collector module 108 may have a generally rigid structure. The engine 806, alternator 812, and exhaust chamber 810 may be rigidly connected to each other for efficient power transfer. The assembly of the engine 806, alternator 812, and exhaust chamber 810 can be secured to the frame of the module 108 by a cushioned or resilient support (e.g., rubber washers) so that the assembly may "float" within the heat collector module 108 to isolate the assembly from external stresses, such as forces acting on the dome. Connections into the sealed heat collector module 108 may be by way of relatively flexible conduits and wires.

The liquid volume 306 may include an inlet for liquid 512, such as water, to enter the liquid volume 306 and an outlet for liquid 514 to leave the liquid volume 306.

Connectors 520, 522 may be attached to the frame 308 of the module 108 to provide fluid communication between the liquid volume 306 in the frame 308 and, for example, another liquid volume 306 at another module 108. As such, the liquid volumes 306 of different modules 108 may be connected to provide for liquid flow within the dome 104.

Connectors 524, 526 may be provided to the liquid coil 808 to provide fluid communication between the liquid coil 808 and a cooling system, such as a heat exchanger with the ocean or other body of water, a refrigerator on board the vessel, or similar.

The connectors 520, 522, 524, 526 allow for the module 108 to be to share fluid and/or communicate fluid with a common heat exchanger.

Figure 6:
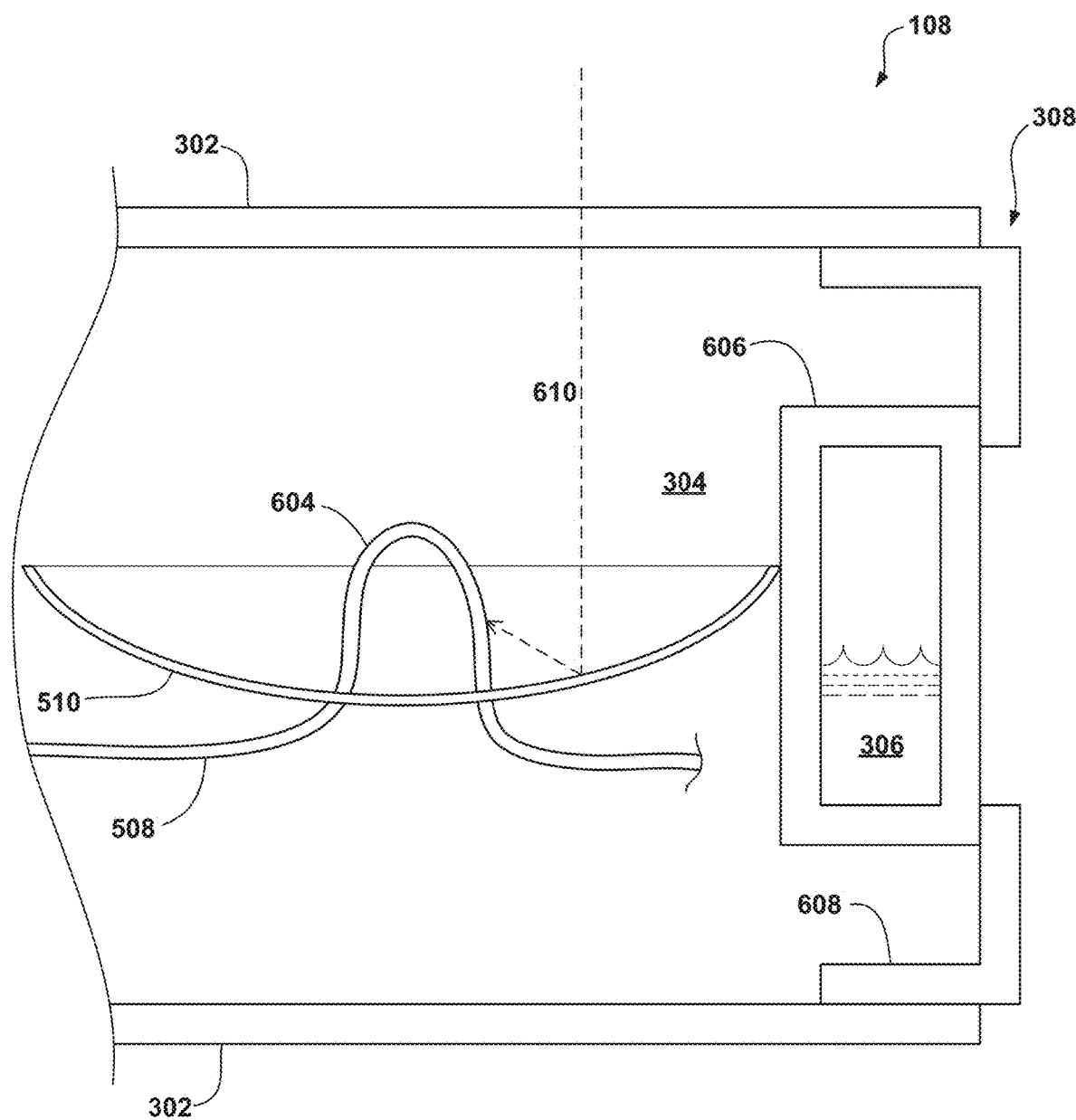
FIG. 6 depicts a cross-section of the example sealed modular heat collector of FIG. 3 or FIG. 4.

Referring now to FIG. 6, a cross-section of a sealed heat collector module 108 is shown. Opposing panels 302 are depicted enclosing volume 304. Gas conduit 508, a mirror 510, and a heat-exchanging portion 604 of the gas conduit 508 are depicted within volume 304. Frame 308 is also depicted having a hollow cross-section, inside of which a liquid volume 306 is also shown.

The gas conduit 508 may run under the mirror 510 and extend through the mirror 510 (via a pair of holes) to provide the heat-exchanging portion 604. The heat-exchanging portion 604 of the gas conduit 508 may be positioned at or near the focal point of the mirror 510. The heat-exchanging portion 604 may be shaped to receive heat input from the mirror 510, such as from solar radiation 610 that enters the volume 304 through a panel 302 and that may be reflected by the mirror 510. The heat-exchanging portion 604 may have any suitable heat-collecting shape, such as a loop, coil, flattened portion, ribbed portion, kettle-like volume, or similar. The heat-exchanging portion 604 may be made of copper or a similar material suitable for conducting heat to the gas within.

The frame 308 may include a box tube section 606 and angle sections 608. The angle sections 608 may be attached to the top and bottom of box tube section 606 to offset the panels 302 from the box tube section 606. The box tube section 606 may contain the liquid volume 306 and the angle sections 608 may provide distance between the box tube section 606 and the panels 302.

Figure 14:
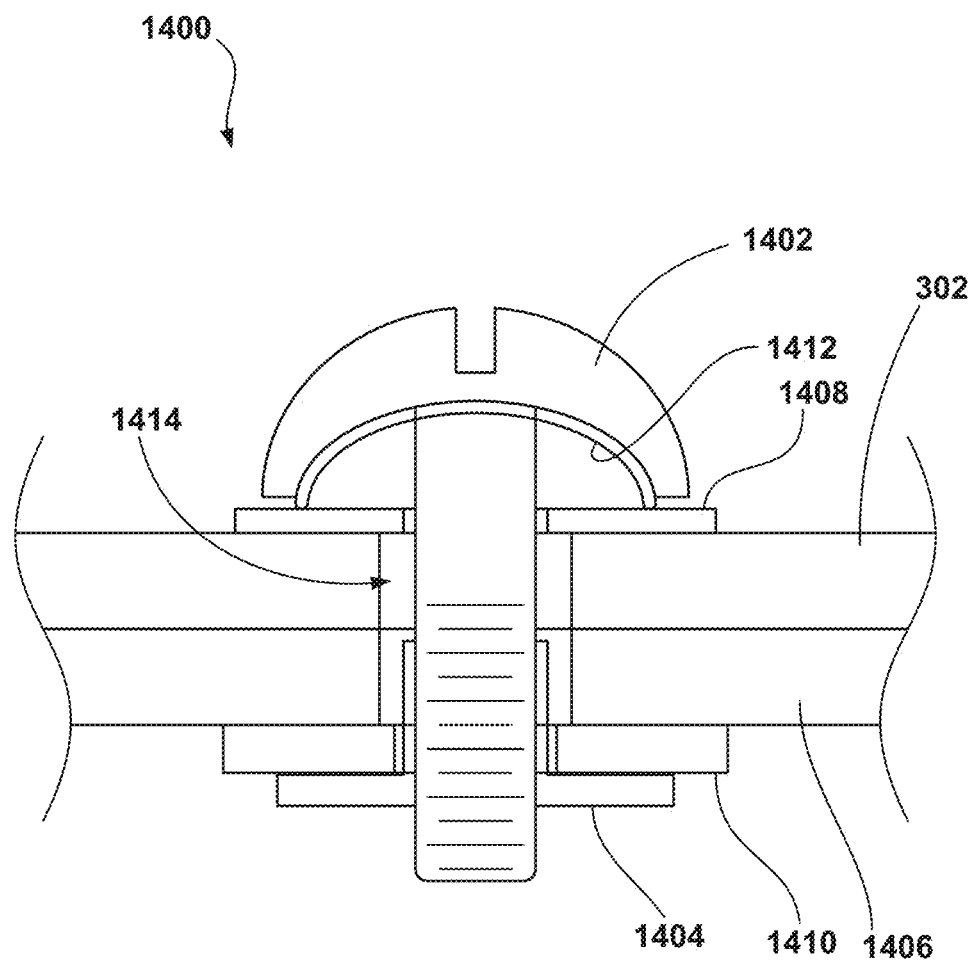
FIG. 14 is a cross-sectional view of an electrolysis/corrosion resistant fastener.

Electrolysis/corrosion resistant fasteners, such as that depicted in FIG. 14, may be used to attach the panels 302 to the frame 308, such as to the angle sections 608.

A modular unit that is not configured as a heat collector may be similar in structure to the modular heat collectors shown in FIGS. 4, 5, and 6, except that components internal to the opposing panels 302 and frame 308 may be omitted or different. For example, a modular unit used as a sail surface may include a frame 308 and one or both panels 302 and otherwise be empty. A modular unit used for storage may have panels 302 that are opaque and sufficiently stiffened to hold gear. A modular unit used as a door may have handles, a latch, and a lock included.

Referring now to FIG. 7, a joint assembly 700 is shown generally.

The joint assembly 700 attaches two adjacent modules 108 at respective edges. The joint assembly 700 includes a pivot joint 702 which may include circular sections attached to each module 108. A pin may be run through the circular sections to form a hinge.

An upper flexible connector membrane 114 may span an upper gap between the frames 308 of the modules 108. The upper flexible connector membrane 114 may be shaped to form a trough to collect rainwater and direct it to a particular area of the dome 104. The dome 104 may thus collect rainwater.

A lower flexible connector membrane 704 may span a lower gap between the frames 308 of the modules 108.

The upper and lower flexible connector membranes 114, 708 may be made of flexible plastic, rubber, synthetic rubber, or similar material.

Figure 8:
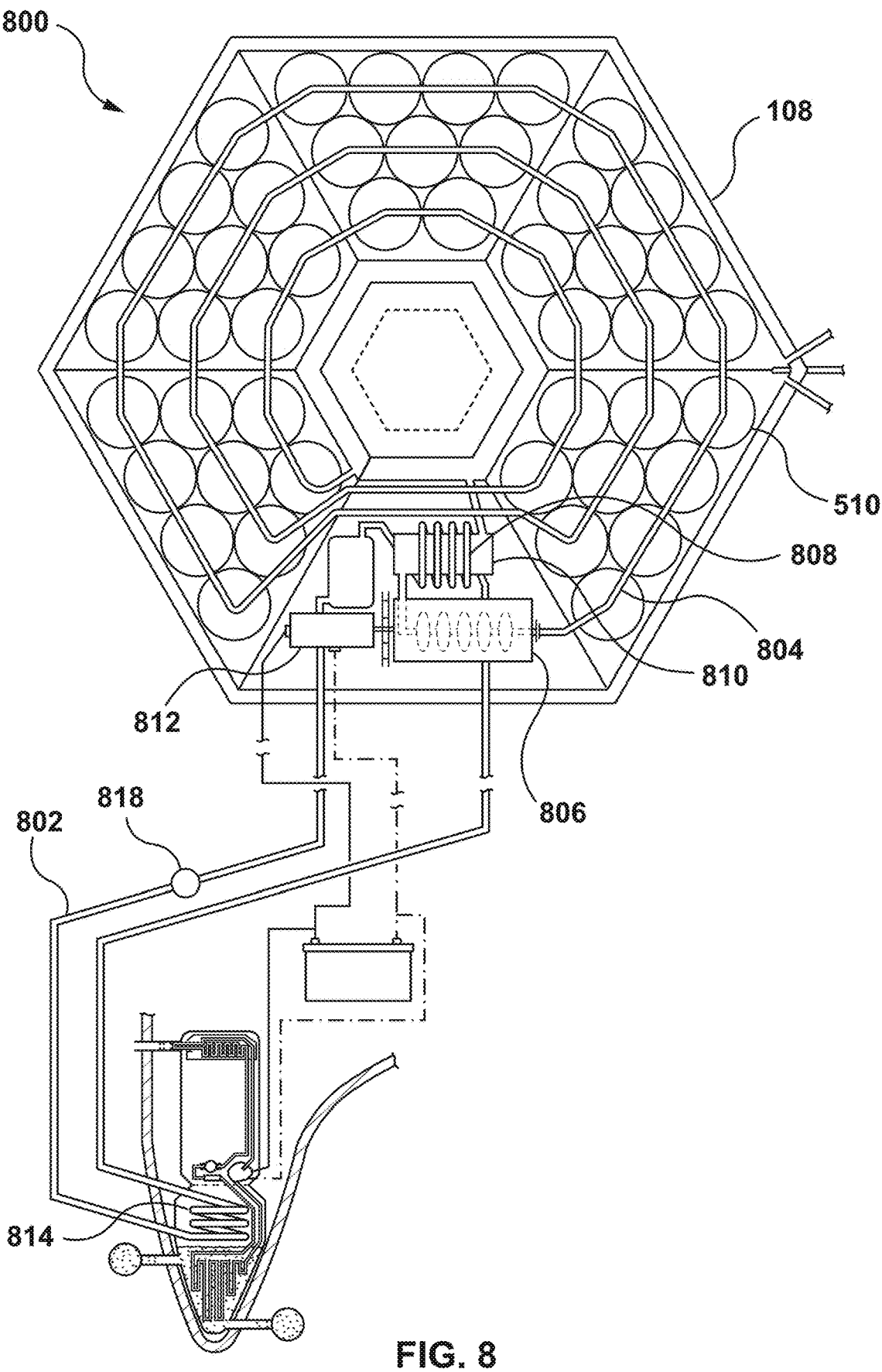
FIG. 8 depicts a water loop and a gas loop.

Referring now to FIG. 8, a dual-fluid heat loop 800 is shown generally. The dual-fluid heat loop 800 is shown in a hexagonal heat-collecting module 108. However, it should be understood that the dual-fluid heat loop 800 may be provided in other modules.

The dual-fluid heat loop 800 includes a closed liquid loop 802 and a closed gas loop that includes a gas conduit 508. The closed gas loop uses an engine 806 to extract energy from heat collected by the module 108. The closed liquid loop 802 increases a temperature different experienced by the engine 806.

The closed gas loop includes a gas conduit 508 in thermal proximity to mirrors 510, an engine 806, an exhaust chamber 810, and a check valve 515 or similar one-way valve to control gas flow to be in one direction.

The closed liquid loop 802 includes a first coil 808 thermally coupled to the exhaust chamber 810 and a second coil 814. The first coil 808 may wrapped around the exhaust chamber 810 or provided inside the exhaust chamber 810. The second coil 814 may be positioned to indirectly or directly thermally interact with the body of water on which the vessel travels. For example, the second coil 814 may be located at a cold side of domestic refrigerator at the vessel, where the domestic refrigerator is in thermal interaction with the body of water. In other examples, the second coil 814 may directly thermally interact with the body of water, such that the second coil 814 may be in direct contact with water of the body of water. For example, the second coil 814 may be immersed in the body of water. The closed liquid loop 802 may include a pump 818 to force circulation of the liquid therein.

Gas in the closed gas loop is heated at the gas conduit 508 by, for example, heat from the mirrors, and drives the engine 806 to rotate to drive an alternator 812 to produce electrical power. Liquid is circulated through the closed liquid loop 802 to cool the gas at the exhaust chamber 810 as it leaves the engine 806, so as to increase the temperature/pressure differential on which the engine 806 operates. Electrical power produced by the alternator 812 may be stored in batteries 816 to be used as vessel motive power or for domestic appliances. Thus, the dual-fluid heat loop 800 may be used to both power the vessel 100 and provide for other electrical needs for the vessel 100.

It is contemplated that the volume and/or cross-sectional area of the exhaust chamber 810 is selected to have a specific relationship to the volume and/or cross-sectional area of the gas loop formed by the conduit 508, so that draw through the loop and engine 806 is encouraged. The principles taught by Rumford concerning fireplaces can be applied.

Figure 9:
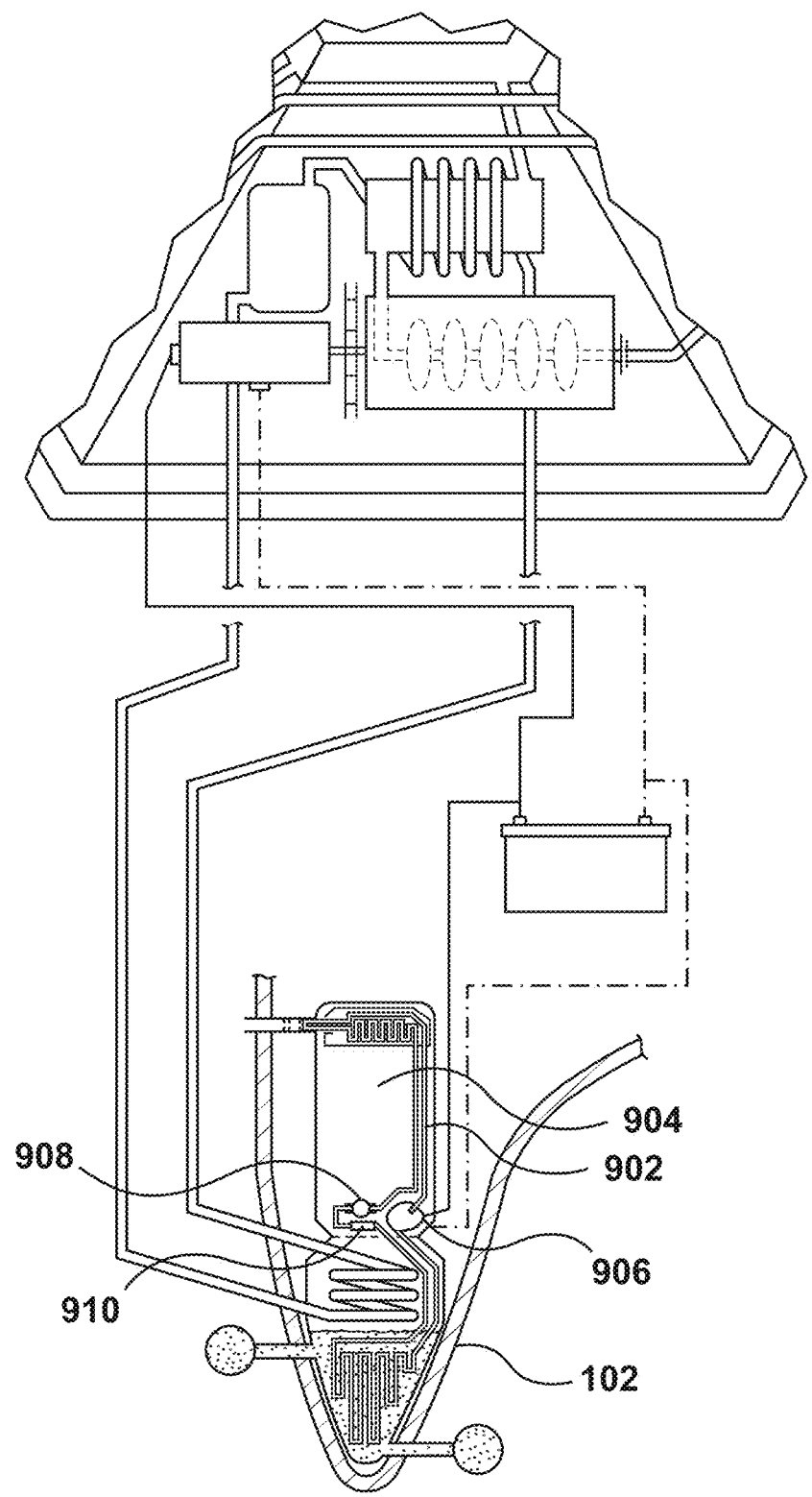
FIG. 9 depicts a water loop and a fridge loop.

Referring now to FIG. 9, at least one of the plurality of hulls 102 may contain a refrigeration loop 902 to create a refrigerated environment 904 the hull 102.

The refrigerated environment 904 may include a compressor 906, an expansion valve 908, and a dryer 910. The refrigerated environment 904 may serve as a traditional refrigerator for domestic purposes and may further provide cooling to a closed liquid loop 802.

In operation, cold water from around the hull 102 may be used to cool refrigerant that is circuited through the compressor 906, expansion valve 908, and dryer 910. A portion of the closed liquid loop 802, such as a coil thereof, may be located in the refrigerated environment 904 to cool the liquid flowing in the closed liquid loop 802, As such, the refrigeration loop 902, cold water from around the hull 102, and the closed liquid loop 802 may cooperate to increase cooling at the exhaust of the engine 806.

Figure 10:
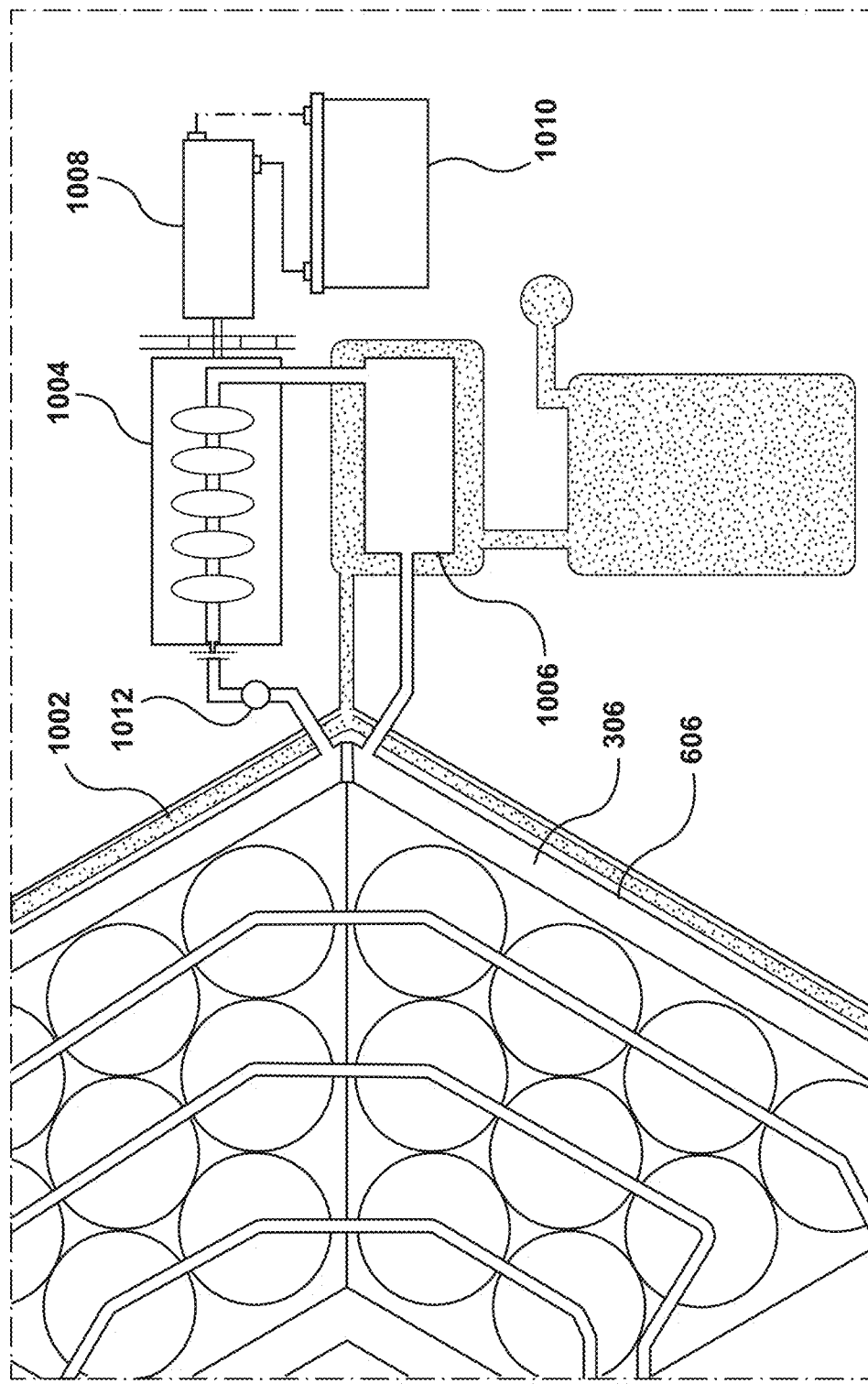
FIG. 10 depicts a residual water heat extraction loop.

Referring now to FIG. 10, an engine 1004 may be connected to the frame 308 to be driven by heated liquid/gas 306 from within a box tube section 606. An exhaust chamber 1006 may be further connected to the engine 1004. The exhaust chamber 1006 may be in fluid communication with a cooled liquid volume 1002, in a closed system outside the module. The cooled liquid volume 1002 may be supplied by collected rainwater, such as may be collected by connector membranes 114. An alternator 1008 may also be connected to the engine 1004 to convert mechanical energy generated by the engine 1004 to electrical energy that may be stored in a battery 1010.

A one-way valve 1012 may be provided to ensure circulation of heated liquid/gas is in the correct direction.

Figure 11:
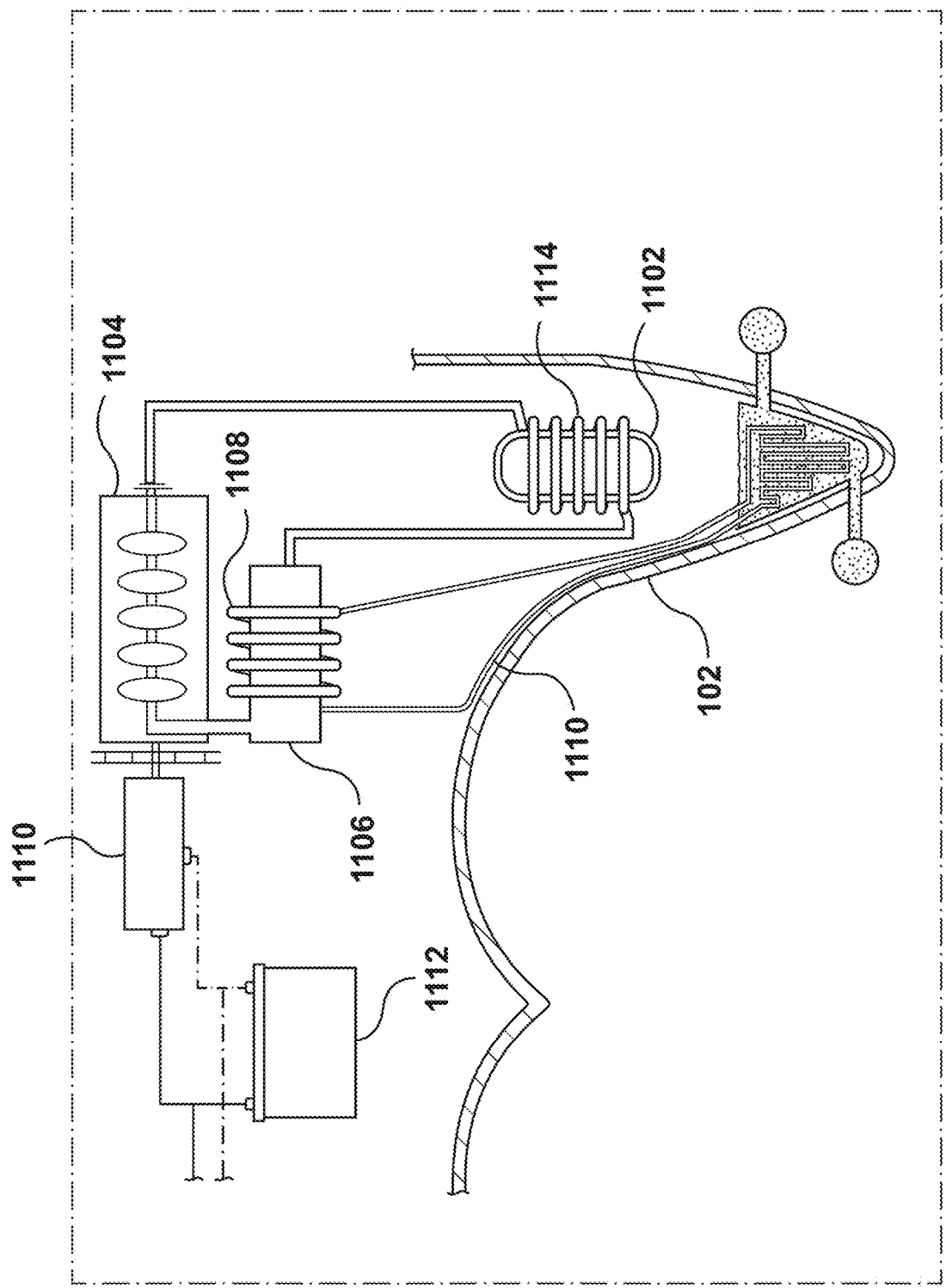
FIG. 11 depicts a main engine heat extraction loop.

Referring now to FIG. 11, heat harvested from the batteries and electric motor and drivetrain 1102 that mobilizes the vessel 100 may also be convertible to electricity and stored in a battery 1112.

The electric drive motor 1102 that propels the vessel may be substantially surrounded by a fluid coil 1114 that is connected to a heat recovery engine 1104. The heat recovery engine 1104 may be connected to a heat recovery exhaust chamber 1106 and an alternator 1110.

Heated gas from the gas coil 1114 may drive the heat recovery engine 1104 to be converted into electricity by the alternator 1110 before being stored in a battery 1112.

The heat recovery exhaust 1106 of heat recovery engine 1104 may be substantially surrounded by a refrigerant coil 1108. The refrigerant coil 1108 may be a portion of a water loop 1110 that is in thermal communication with a body of water or the inside of a hull 102 of the vessel 100.

Cooled gas from the heat recovery engine exhaust may drive the heat recovery engine 1104 to be converted into electricity before being stored in a battery 1112.

Thus, heat extracted from the batteries and a motor 1102 of the vessel 100 may also be convertible to electricity and stored in a battery 1112 to recover energy that may otherwise be lost.

Figure 12:
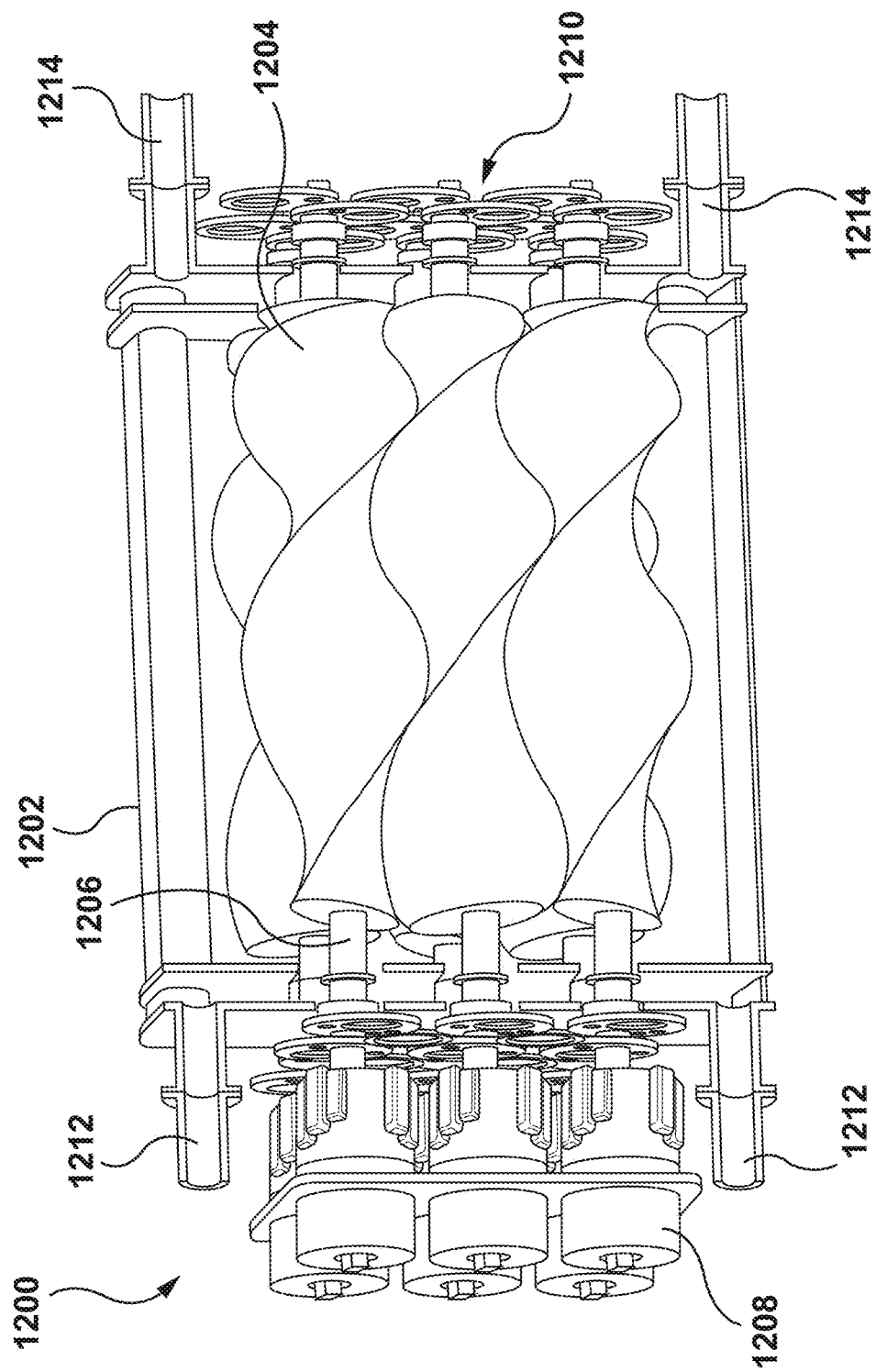
FIG. 12 depicts an example rotary engine.

FIG. 12 shows an example rotary engine 1200 that may be used as any of the energy extracting engines discussed herein, such as the engines provided to the vessel 100

The engine 1200 includes a housing 1202 that contains an array of twisted rotors 1204 arranged in a parallel to one another. Each rotor 1204 may turn on a shaft 1206 and the rotors 1204 may all be identical in shape and complementary in orientation. A portion of the housing 1202 is omitted from view for sake of explanation.

The rotors 1204 are helically shaped and have lens-shaped cross sections to form the walls of working volumes, which move axially from one end of the array to the other end in response to synchronized rotor rotation caused by a gas pressure differential. The pitch of the helical shape may increase along the length of a rotor 1204 in the direction of gas flow (right to left in the figure). Thus, the working volumes may increase in volume during their travel. The rotors 1204 do not touch one another, which may avoid wear and friction. Gaps between the rotors 1204 are narrow enough to avoid significant loss of gas or power. Any practical number of rotors 1204 may be provided.

The rotors 1204 may be shaped to allow a working volume to expand as high-pressure gas introduced at one or more gas inlets 1214 (right side) urges the rotors 1204 to rotate. A working volume expands as the gas expands with decreasing pressure until finally, after several rotations of the rotors 1204, the working volume is brought into fluid communication with one or more gas outlets 1212 (left side). This mechanical energy can be captured by one or more gear assemblies connected to one or more alternators, depicted generally at 1208, As such, electrical energy can be captured from pressurized fluid.

FIG. 14 shows an example, electrolysis/corrosion resistant fastener 1400 that may be used when joining components of the vessel 100 discussed herein, such as when assembling a panel 302 with a frame 308 to form a module.

The fastener 1400 includes a bolt 1402, which may be stainless steel. The bolt extends through holes in frame material 1406, which is aluminum, and the panel 302, which is polymer. The bolt 1402 is mated with a weld nut 1404 which may also be stainless steel. A dielectric/insulative washer 1408, which may be relatively thin and made of nylon, is located between the head of the bolt 1402 and the panel 302. The head of the bolt 1402 has a dished interior that contains a dielectric/insulative insert 1412, such as made of rubber, to contact the dielectric/insulative washer 1408, Another dielectric/insulative washer 1410, such as a fibre washer saturated in marine epoxy, is located between the weld nut 1404 and the frame material 1406. The holes in the frame material 1406 and panel 302 are large enough to create an air gap with the bolt 1402.

Thus, a thermal energy powered catamaran vessel is provided along with certain specific components of it, namely, a sealed heat collector and a dual-fluid heat loop apparatus. A person of skill in the art will understand that variants of the invention may be achieved using the disclosure provided herein and such variants as reasonably inferred from this specification are intended to be covered by the present disclosure.

The calculations shown in Table 1 below (with Microsoft Excel row and column labelling convention) further illustrate the advantages of the invention.

The scope of the claims should not be limited by the embodiments set forth in the above examples but should be given the broadest interpretation consistent with the whole description.

TABLE 1

| | A | B | C | D | E | F | G | H |
|---|---|---|---|---|---|---|---|---|
| 1 | Calculations_Dec6.19 | | | | | | | |
| 2 | CITS | Length | Length | Length | Hull Beam | Hull Beam | Draft | |
| 3 | Jeff Rabjohn | Hull | Hull | Beam | at waterline | Width to | Depth | |
| 4 | CAT-in-the-SUN | Overall | waterline | Ratio | | Draft Ratio | below | |
| 5 | | | | waterline | | 2.8+ friction | waterline | given Halme Cm = .785 |
| 6 | | | | | | 1.5-2.8 elipse | | using Halme Cm |
| 7 | | | | | | 1.1-1.4 deep v | | using Halme Cp |
| 8 | | | | | | low fast | | |
| 9 | | Lh | LwL | Lbr | BwL | Btr | Tc | Math TcO |
| 10 | | set | set | Lbr=LwL/BwL | Bwl = LwL/Lbr | Btr = BwL/Tc | Tc = BwL/Btr | 2050 Bwl Lwl Cp Cm |

TABLE 1-continued

| | | | 9-12 for | Halme | Halme 1.9 | Halme | | |
|---|---|---|---|---|---|---|---|---|
| | | 3.2808 | displace hull | setBwL = 1.09 | adjust | adjusted | | |
| | | | <8 waves | | to Oster 2.0 | to Oster | | |
| Halme | | | sail cat given | given | Displacement | given Tc = .57 | | |
| Sailing catamaran | 40.03 | 39.37 | Halme | | 3.58 so set | 1.79 | 2 hulls | |
| diesel backup | 12.20 | 12.00 | 11.00 | 1.091 | 2.00 | 0.545 | 12,429.26 | |
| if 11.23 m waterline | 11.42 | 11.23 | 11.00 | 1.021 | 2.00 | 0.510 | 10,885.35 | |
| | 37.46 | 36.84 | | 3.35 | | 1.675 | | |
| | 333.55 | 328.08 | | 29.83 | | 14.913 | | |
| if 100 m waterline | 101.67 | 100.00 | 11.00 | 9.091 | 2.00 | 4.545 | 863,143.18 | |
| | | | | | | | | |
| Compromis 34 | | sailboat | Como 34 | esti | so set | given | | |
| | | 29.53 | | 5.47 | | 4.92 | | |
| Monohull sailboat | 10.40 | 9.00 | 5.40 | 1.67 | 1.11 | 1.50 | | |
| diesel backup | | 11.23 | 5.40 | 2.08 | 1.11 | 1.87 | | |
| if 11.23 m waterline | | 36.84 | | 6.82 | | 6.15 | | |
| | | | | | | | | |
| Leopard 43 | | power cat | esti | | so set | given | | |
| Power catamaran | | 40.81 | Lep 43 | 4.92 | | 3.08 | | |
| Diesel powered | 13.00 | 12.44 | 8.29 | 1.50 | 2.20 | 0.94 | | |
| if 11.23 m waterline | 11.74 | 11.23 | 8.29 | 1.35 | 2.20 | 0.62 | | |
| | | 36.84 | | 4.44 | | 2.02 | | |
| SSV16 Lund | | gas boat | ssv16 | esti | so set | known | | |
| Aluminium boat | 16.00 | 13.00 | 5.42 | 2.40 | 1.83 | 1.31 | | |
| gas powered | 4.88 | 3.96 | 5.42 | 0.73 | 1.83 | 0.40 | | |
| if 11.23 m waterline | | 11.23 | 5.42 | 2.07 | 1.83 | 1.13 | | |
| | | 36.84 | | 6.80 | | 3.71 | | |
| Tiara 43 Open | | diesel boat | | | esti | | | |
| Powerboat | 43.24 | 37.73 | Tiara | 8.80 | calculate | 4.00 | | |
| Diesel powered | 13.18 | 11.50 | 4.29 | 2.68 | 2.20 | 1.22 | | |
| if 11.23 m waterline | 12.87 | 11.23 | 4.29 | 2.62 | 2.20 | 1.19 | | |
| | | 36.84 | | 8.59 | | 3.90 | | |
| CAT-in-the-SUN | 3.2808 | CITS | | | | | | |
| Sail, solar, heat | 1.02 | | CITS | | so set | | | |
| powered catamaran | 4.34 | 4.27 | 12.49 | 0.34 | 2.00 | 0.17 | | |
| if 14 ft at waterline | | 14.01 | 12.51 | 1.12 | so set | 0.56 | | |
| | | CITS | | | Planet Heat | | | |
| if 31 m at waterline | 31.52 | 31.00 | 12.49 | 2.48 | 2.00 | 1.24 | | |
| | | 101.71 | | 8.14 | so set | 4.07 | | |
| | | solar | | | | | | |
| Turanor Planet Solar | | 101.71 | Turanor | 8.84 | so set | 4.42 | | |
| Guiness record | 35.00 | 31.00 | 11.50 | 2.70 | 2.00 | 1.35 | | |
| Solar powered | | 36.84 | | 3.20 | | 1.60 | | |
| if 11.23 m waterline | 12.68 | 11.23 | 11.50 | 0.98 | 2.00 | 0.49 | | |
| if 100 m waterline | 112.90 | 100.00 | 11.50 | 8.70 | 2.00 | 4.35 | | |
| | | 328.08 | | 28.53 | | 14.26 | | |
| | Lh | LwL | Lbr | BwL | Btr | Tc | Math TcO | |
| | set | set | Lbr = LwL/BwL | Bwl = LwL/Lbr | Btr = BwL/Tc | Tc = BwL/Btr | 2050 Bwl Lwl Cp Cm | |
| CAT-in-the-SUN | | 3.2808 | | | CITS | | | |
| Sail, solar, heat | CITS | set | CITS | | | | | |
| powered catamaran | 37.50 | 36.84 | Oncilla | 2.95 | so set | 1.47 | | |
| if 11.23 m at wline | 11.43 | 11.23 | 12.49 | 0.90 | 2.00 | 0.45 | | |
| if100 m at waterline | 101.75 | 100.00 | 12.49 | 8.01 | 2.00 | 4.00 | | |
| | | 328.03 | | 26.27 | | 13.13 | | |
| | | | 3.2808 | | | | | |

| I | J | K | L | M | N |
|---|---|---|---|---|---|
| | Canoe | | | x-section | Hull |
| calculate | Body | | calculate | area | Speed |
| TcO Draft | | | CmO Canoe Body | | squared |
| from | | given Halme Tc = .57 | from | Oster | |
| Oster | | using Halme Tc | Oster | | |
| Displacement | | using Halme Cp | Displacement | | |
| | | | | | |
| TcO | Cm | Math CmO | CmO | CSA | Acc |
| TcO = wDispO/ 2050 Bwl Lwl Cp Cm | set | 2050 Bwl Lwl Cp Tc | CmO = wDispO/ 2050 Bwl Lwl Cp Tc | web | Acc = v2 |
| | Halme | | | calculator | |
| | adjusted | | | Oster | |
| | to | | | | |
| | Oster | | | | |
| 2 hull | given Cm = .785 | 2 hulls | | | |
| 0.546 | | 0.752 | 9,025.069 | 0.752 | 0.934 | 71.44 |
| 0.511 | | 0.752 | | | 0.818 | 66.86 |
| | | | | | | |
| | | | | | | |
| 4.550 | | 0.752 | | | 64.872 | 595.36 |

TABLE 1-continued

| | | | | | | | | |
|---|---|---|---|---|---|---|---|---|
| 22 | | | | | | | | |
| 23 | | | | | | | | |
| 24 | | | | | | | 1.090 | 16.40 |
| 25 | | | | | | | 1.523 | 20.47 |
| 26 | | | | | | | | |
| 27 | | | | | | | | |
| 28 | | | | | | | | |
| 29 | | | | | | | | |
| 30 | | | | | | | 1.768 | 74.06 |
| 31 | | | | | | | 1.438 | 66.86 |
| 32 | | | | | | | | |
| 33 | | | | | | | cant | |
| 34 | | | | | | | but if | |
| 35 | | | | | | | 0.210 | 7.22 |
| 36 | | | | | | | 2.150 | 20.47 |
| 37 | | | | | | | | |
| 38 | | | | | | | | |
| 39 | | | | | | | | |
| 40 | | | | | | | 2.190 | 20.96 |
| 41 | | | | | | | 1.590 | 20.47 |
| 42 | | | | | | | | |
| 43 | | | | | | | | |
| 44 | | so set | | | | | | |
| 45 | | | 0.752 | | | | 0.092 | 25.42 |
| 46 | | | | | | | | |
| 47 | | so set | | | | | | |
| 48 | | | 0.752 | | | | 4.836 | 184.56 |
| 49 | | | | | | | | |
| 50 | | | | | | | | |
| 51 | | so set | | | | | | |
| 52 | | | 0.752 | | | | 5.704 | 184.56 |
| 53 | | | | | | | | |
| 54 | | | 0.752 | | | | 0.749 | 66.86 |
| 55 | | | 0.752 | | | | 59.354 | 595 36 |
| 56 | | | | | | | | |
| 57 | TcO | Cm | | Math CmO | CmO | CSA | Acc | |
| 58 | TcO = wDispO/ | | | 2050 Bwl Lwl Cp Tc | CmO = wDispO/ | | Acc = v2 | |
| | 2050 Bwl Lwl Cp Cm | | | | 2050BwlLwlCpTc | | | |
| 59 | | | | | | | | |
| 60 | | | | | | | | |
| 61 | | so set | | | | | | |
| 62 | | | 0.752 | | | | 0.635 | 66.86 |
| 63 | | | 0.752 | | | | 50.319 | 595.36 |
| 64 | | | | | | | | |
| 65 | | | | | | | | |

| | O | P | Q | R | S | T | |
|---|---|---|---|---|---|---|---|
| 1 | | | | | | | |
| 2 | Mass of empty boat factor | | Power | Displacement | Boat | Prismatic | |
| 3 | | | Required | Kg3 | Displace | Coefficient | |
| 4 | | | for hull speed | | vol m3 | | |
| 5 | | | | | | range .5-7.5 | |
| 6 | | | | | | slow-fast | |
| 7 | | | | | | | |
| 8 | | | | | | | |
| 9 | Mss | Math Mss | Pr | wDisoO | $^\wedge$boatO | Cp | |
| 10 | Mss = .4Tc.62Bwl.95LwlCp/ Tc Bwl Lwl Cp | | Pr = Mss wDispO/Acc | web | $^\wedge$boatO = wDispO/1025 | set | |
| | TcBwlLwlCp | | | | | | |
| 11 | | | Power required | calculator | | | |
| 12 | | | | Oster | | | |
| 13 | | | | | | | |
| 14 | | | | | | | |
| 15 | | | | 2 hulls | | given | |
| 16 | 0.236 | 4.21 | 22.37 | 6784 | 6.619 | 0.590 | |
| 17 | 0.236 | 3.45 | 19.61 | 5566 | 5.430 | 0.590 | |
| 18 | | | | | | | |
| 19 | | | | | | given | |
| 20 | 0.236 | 2438.02 | 1554.27 | 3927636 | 3831.840 | 0.590 | |
| 21 | | | | | | | |
| 22 | | | | | | | |
| 23 | | | | | | set | |
| 24 | 0.236 | 12.83 | 82.48 | 5742 | 5.602 | 0.570 | |
| 25 | 0.236 | 24.94 | 128.23 | 11139 | 10.867 | 0.570 | |
| 26 | | | | | | | |
| 27 | | | | | | | |
| 28 | | | | | | | |
| 29 | | | | | | set | |
| 30 | 0.236 | 10.88 | 44.45 | 13972 | 13.631 | 0.620 | |
| 31 | 0.236 | 5.81 | 36.17 | 10265 | 10.015 | 0.620 | |

TABLE 1-continued

| | | | | | | |
|---|---|---|---|---|---|---|
| 32 | | | | | | |
| 33 | | | | | | |
| 34 | | | | | set | |
| 35 | 0.298 | 0.74 | 22.49 | 546 | 0.533 | 0.640 |
| 36 | 0.298 | 16.86 | 180.71 | 12432 | 12.129 | 0.640 |
| 37 | | | | | | |
| 38 | | | | | | |
| 39 | | | | | set | |
| 40 | 0.236 | 24.42 | 243.42 | 21654 | 21.126 | 0.650 |
| 41 | 0.236 | 22.74 | 231.94 | 20149 | 19.658 | 0.650 |
| 42 | | | | | | |
| 43 | | | | | | |
| 44 | | | | | DaVinci | |
| 45 | 0.236 | 0.15 | 2.28 | 246 | 0.240 | 0.618 |
| 46 | | | | | | |
| 47 | | | | | DaVinci | |
| 48 | 0.236 | 59.01 | 121.24 | 94973 | 92.657 | 0.618 |
| 49 | | | | | | |
| 50 | | | | | | |
| 51 | | | | | so set | |
| 52 | 0.236 | 66.45 | 117.71 | 92207 | 89.958 | 0.590 |
| 53 | | | | | so set | |
| 54 | 0.236 | 3.16 | 15.47 | 4390 | 4.283 | 0.590 |
| 55 | 0.236 | 2230.62 | 1223.99 | 3093015 | 3017.576 | 0.590 |
| 56 | | | | | | |
| 57 | Mss | Math Mss | Pr | wDispO | $\triangle$boatO | Cp |
| 58 | Mss = .4Tc.62Bwl.95LwlCp/ TcBwlLwlCp | Tc Bwl Lwl Cp | Pr = Mss wDispO/Acc web | | $\triangle$boatO = wDispO/1025 set | |
| 59 | | | | | | |
| 60 | | | | | DaVinci | |
| 61 | | | | | | |
| 62 | 0.236 | 2.81 | 15.93 | 4521 | 4.411 | 0.618 |
| 63 | 0.236 | 1980.77 | 1262.67 | 3190750 | 3112.927 | 0.618 |
| 64 | | | | | | |
| 65 | | | | | | |

| | U | V | W | X | Y | Z | AA |
|---|---|---|---|---|---|---|---|
| 1 | | | | | | | |
| 2 | Speed | | Hull | Empty | | Carrying | Beam |
| 3 | to Length | | Speed | Boat | | Capacity | Overall |
| 4 | Ratio | | | Displace | | | |
| 5 | 2.44 multihull | | | kg3 | | is | Width |
| 6 | 1.35 monohull | | | Oster | | max safe load | of boat |
| 7 | | | | | wt boat | | |
| 8 | | | | | | | |
| 9 | SLR | Math v | V | dispOe | math CC | CC | Bh |
| 10 | SLR = v/(sqrtLwL) | sq root Lwl | v = SLR(sqrtLwL) | dispOe = Mss wDispO | wDispO-wDispOe | CC = .2(wDispO-wDispOe) | Bh = Bh1 + Bcb |
| 11 | | | calculate each | | | | |
| 12 | | | 1 m/sec = 2.237 Mile/hour | | | | Halme for 12.2 |
| 13 | | | 1 m/sec = 3.6 Km/hour | | | | set Bh = 7.07 |
| 14 | | | 1 m/sec = 1.944 Knot | | | float plane | |
| 15 | set | | | Emply | | lower | |
| 16 | | 2.44 | 3.46 | 8.452 | 1598.3 | 5185.7 | 1037.1 | 7.070 |
| 17 | | 2.44 | 3.35 | 8.177 | 1311.3 | 4254.7 | 850.9 | 6.619 |
| 18 | | | | | | heel | | 0.000 |
| 19 | set | | | | | | |
| 20 | | 2.44 | 10.00 | 24.400 | 925351.0 | 3002285.0 | 600457.0 | 58.939 |
| 21 | | | | | | | |
| 22 | set | | | | | float plane | |
| 23 | | | | | | | |
| 24 | | 1.35 | 3.00 | 4.050 | 1352.8 | 4389.2 lower | 0.305 |
| 25 | | 1.35 | 3.35 | 4.524 | 2624.3 | 8514.7 | 1702.9 | 0.380 |
| 26 | | | | | | transom | |
| 27 | | | | | | | |
| 28 | | | | | | given | |
| 29 | set | | | | | float plane | |
| 30 | | 2.44 | 3.53 | 8.606 | 3291.8 | 10680.2 lower | 22.047 |
| 31 | | 2.44 | 3 35 | 8.177 | 2418.4 | 7846.6 | 1569.3 | 6.720 |
| 32 | | | | | | transom | 6.066 |
| 33 | set | | | | | float plane | 19.903 |
| 34 | | | | | | lower | 6.000 |
| 35 | | 1.35 | 1.99 | 2.687 | 162.4 | 383.6 | 76.7 | 1.829 |
| 36 | | 1.35 | 3.35 | 4.524 | 3698.5 | 8733.5 | 1746.7 | 5.183 |
| 37 | | | | | | transom | 17.005 |
| 38 | | | | | | float plane | |
| 39 | set | | | | | lower | 15.322 |
| 40 | | 1.35 | 3.39 | 4.578 | 5101.7 | 16552.3 | 3310.5 | 4.670 |
| 41 | | 1.35 | 3.35 | 4.524 | 4747.1 | 15401.9 | 3080.4 | 4.560 |

TABLE 1-continued

| | | | | | | | | |
|---|---|---|---|---|---|---|---|---|
| 42 | | | | | | transom | | 14.962 |
| 43 | | | | | | | | |
| 44 | set | | | | | | | |
| 45 | | 2.44 | 2.07 | 5.042 | 58.0 | 188.0 | 37.6 | 2.397 |
| 46 | | | | | | | | 7.865 |
| 47 | set | | | | | | | 27.116 |
| 48 | | 2.44 | 5.57 | 13.585 | 22375.6 | 72597.4 | 14519.5 | 17.405 |
| 49 | | | | | | | | 57.102 |
| 50 | | | | | | float plane | | |
| 51 | set | | | | | high | Turanor | |
| 52 | | 2.44 | 5.57 | 13.585 | 21724.0 | 70483.0 | 14096.6 | 17.747 |
| 53 | set | | | | | | | |
| 54 | | 2.44 | 3.35 | 8.177 | 1034.3 | 3355.7 | 671.1 | 6.429 |
| 55 | | 2.44 | 10.00 | 24.400 | 728714.3 | 2364300.7 | 472860.1 | 57.249 |
| 56 | | | | | | lifted | | |
| 57 | SLR | Math v | v | dispOe | math CC | CC | Bh | |
| 58 | SLR = v/(sqrtLwL) | sq root Lwl | v = SLR(sqrtLwL) | dispOe = Mss wDispO | wDispO-wDispOe | CC = .2(wDispO- wDispOe) | Bh = Bh1 + Bcb | |
| 59 | | 2.44 | | | | | | |
| 60 | set | | | | | | plans | |
| 61 | | | | | | | | 20.500 |
| 62 | | 2.44 | 3.35 | 8.177 | 1065.1 | 3455.9 | 1036.8 | 6.305 |
| 63 | | 2.44 | 10.00 | 24.400 | 751740.7 | 2439009.3 | 731702.8 | 56 144 |
| 64 | | | | | | | | |
| 65 | | | | | | | | |

| | AB | AC | AD | AE | AF | AG | AH | AI |
|---|---|---|---|---|---|---|---|---|
| 1 | | | | | | | | |
| 2 | m2 of | Sun | Power | m2 | math Sail | Sail | Power | % |
| 3 | collectors | Power | per | sail | Power | Power | Harnessed | Power |
| 4 | 14of17mod .823 | | dome module | | .75 kw/m2 | Realized | From | Harnessed |
| 5 | 1/2 sphere = 2pie r2 | CITS .23 | kw | given | 60% time | up to .6Pr | Environment | Environment |
| 6 | | Turanor .188 | | Halme | | or .75sail.3 | kw | |
| 7 | 11 + 2 + 1 mod | | Oncilla | Turanor | | | | |
| 8 | m2 = 2 pie r2 823 | | | 2 pie r2 | | | | |
| 9 | coll | SunP | Ppdm | sail | math SailP | SailP | Pe | % Pe |
| 10 | coll = m2colector | SunP = 188Coll | Ppdm = SunP/14 | sail = m2sail | SP = .75sail.6 | | Pe = SunP + SailP Power Realized | % = 100Pe/Pr got/required |
| 11 | | SunP = .23Coll | | | | | | |
| 12 | | | | | | | | |
| 13 | | | | | | | | |
| 14 | | | | | Full Sail | | | |
| 15 | | | | given | 60% time | | | |
| 16 | | | | | 92.60 | 41.67 | 13.42 | 13.42 | 60 |
| 17 | | | | | 86.66 | 39.00 | 11.77 | 11.77 | 60 |
| 18 | | | | | | | | |
| 19 | | | | given | | | | |
| 20 | | | | | 771.67 | 347.25 | 932.56 | 932.56 | 60 |
| 21 | | | | | | | | |
| 22 | | | | | | | | |
| 23 | | | | esti | | | | |
| 24 | | | | | 122.00 | 54.90 | 49.49 | 49.49 | 60 |
| 25 | | | | | 152.23 | 68.50 | 76.94 | 76.94 | 60 |
| 43 | | | | m2 | | | | |
| 44 | | Dome heat | | sail | | | | |
| 45 | 7.43 | | 1.71 | | 4.51 | | 1.02 | 2.72 | 119 |
| 46 | | | | | | | | |
| 47 | | Dome heat | | | | | | |
| 48 | 391.41 | | 90.02 | | 237.79 | | 53.50 | 143.53 | 118 |
| 49 | Solar | given | | | | | | |
| 50 | Turanor | .188 kw/m2 | | | | | | |
| 51 | 537.00 | | 100.96 | | | | | 100.96 | 86 |
| 52 | realized | | | | | | | |

TABLE 1-continued

|    |   |   |   |   |   |   |   |   |   |
|----|---|---|---|---|---|---|---|---|---|
| 54 | | 70.52 | | 13.26 | | | | 13.26 | 86 |
| 55 | | 5,591.00 | | 1,051.11 | | | | 1,051.11 | 86 |
| 56 | | | | | | | | | |
| 57 | coll | SunP | Ppdm | sail | math SailP | SailP | Pe | % Pe | |
| 58 | coll = m2colector | SunP = .23Coll | Ppdm = SunP/14 | sail = m2sail | SP = .75sail.6 | | Pe = SunP + SailP | % = 100Pe/Pr | |
| 59 | dome | | | dome | | | Power | got/required | |
| 60 | collectors | | | sail | | | realized | | |
| 61 | CAT-in-the-SUN | | | m2 sail | | | | | |
| 62 | 51.37 | 11.81 | 0.84 | 31.21 | | 7.02 | 18.84 | 118 | |
| 63 | 4,072.95 | 936.78 | | 2,474.45 | | 556.75 | 1,493.53 | 118 | |
| 64 | | | | | | | | | |
| 65 | | | | | | | | | |

|    | AJ | AK | AL | AM | AN | AO | AP | AQ |
|----|----|----|----|----|----|----|----|----|
| 1  | | | | | | | | |
| 2  | Power | % | Math | Math | Wetted | Beam | Length | Beam |
| 3  | Harnessed | Power | wetted | wetted | Surface | of ea | Beam | Btwn |
| 4  | From | Harnessed | | | m2 | hull | Ctr | ctrs |
| 5  | Fossil Fuel | Fossil Fuel | | | | topside | Ratio | Beam over - |
| 6  | | | | | | Beam | | beam topside |
| 7  | | | | | | | | Bob = Lh/Lbrc |
| 8  | | | | | | | | |
| 9  | Pff | % Pff | Math wet | Math wet | WSA | Bh1 | Lbrc | Bcb |
| 10 | 1hp = .75 kw | % = 100Pff/Pr | 1.7 Lwl Tc | $\triangle$boat/Tc | WSA = 1.7LwLTc + ($\triangle$boat_/Tc) | 1.4 Bwl | Lbrc = Lh/Bcb | Bcb = Bh - Bh1 |
| 11 | | | | | Dunny-Mumfod | or plans | Halme | Halme |
| 12 | | | | | | | set LBRC = 2.2 | |
| 13 | | | | | | Halme | | |
| 14 | Hp given | | | | | 1.4xBwl | | |
| 15 | | 27.0 | | | | 5.01 | | 18.19 |
| 16 | | 20.3 | 91 | 11.13 | 12.13 | 23.26 | 1.53 | 2.20 | 5.55 |
| 17 | | 17.8 | 91 | 9.75 | 10.64 | 20.38 | 1.43 | 2.20 | 5.19 |
| 18 | | | | | | | | |
| 19 | | | | | | | | |
| 20 | | 236.3 | 15 | 772.73 | 843.00 | 1,615.73 | 12.73 | 2.20 | 46.21 |
| 21 | | | | | | | | |
| 22 | Hp given | | | | | | | |
| 23 | | 27.0 | | | | | | |
| 24 | | 20.3 | 25 | 22.95 | 3.73 | 26.68 | | |
| 25 | | 32.0 | 25 | 35.77 | 5.80 | 41.57 | | |
| 26 | | | | | | | | |
| 27 | | | | | | | | |
| 28 | Hp given | | | | | 1.4xBwl | | |
| 29 | | 160.0 | | | | 6.89 | | |
| 30 | | 120.0 | 270 | 19.88 | 14.50 | 34.38 | 2.10 | 2.81 | 4.62 |
| 31 | | 98.0 | 271 | 11.76 | 16.26 | 28.02 | 1.90 | 2.81 | 4.17 |
| 32 | | | | | | 6.22 | | 13.68 |
| 33 | Hp given | | | | | | | |
| 34 | | 40.0 | | | | | | |
| 35 | | 30.0 | 133 | 2.69 | 1.33 | 4.02 | | |
| 36 | | 556.6 | 308 | 21.62 | 10.71 | 32.33 | | |
| 37 | | | | | | | | |
| 38 | Hp given | | | | | | | |
| 39 | | 358.0 | | | | | | |
| 40 | | 268.5 | 110 | 23.82 | 17.34 | 41.16 | | |
| 41 | | 883.7 | 381 | 22.72 | 16.52 | 39.24 | | |
| 42 | | | | | | | | |
| 43 | | | | | | | | |
| 44 | | | | | | | | |
| 45 | | | | 1.24 | 1.40 | 2.64 | 0.42 | 2.16 | 1.98 |
| 46 | | | | | | | 1.38 | | 6.49 |
| 47 | | | | | | | | |
| 48 | | | | 65.40 | 74.66 | | 3.05 | 2.16 | 14.35 |
| 49 | | | | | | | 10.02 | | 47.09 |
| 50 | | | | | | | | |
| 51 | | | | | | | solve | |
| 52 | | | | 71.03 | 66.74 | 137.77 | 3.72 | 2.21 | 14.03 |
| 53 | | | | | | | | |
| 54 | | | | 9.32 | 8.77 | 18.09 | 1.35 | 2.21 | 5.08 |
| 55 | | | | 739.13 | 694.04 | 1,433.17 | 12.00 | 2.21 | 45.25 |
| 56 | | | | | | | | |
| 57 | Pff | % Pff | Math wet | Math wet | WSA | Bh1 | Lbrc | Bcb |
| 58 | 1hp = .75kw | % = 100Pff/Pr | 1.7 Lw Tc | $\triangle$boat/Tc | WSA = 1.7LWLTc+($\triangle$boat_/Tc) | | | |
| 59 | | | | | | | 1.06/.86 | |
| 60 | | | | | | plans | solve | plans |
| 61 | | | | | | 3.48 | 2.16 | 17.02 |
| 62 | | | | 8.58 | 1.10 | 9.68 | 1.11 | 2.16 | 5.20 |
| 63 | | | | 680.54 | 237.02 | 917.56 | 9.85 | 2.16 | 46.30 |

TABLE 1-continued

| | AR | A | AT | AU | AV | AW |
|---|---|---|---|---|---|---|
| 1 | | | | | | |
| 2 | min | | | | | Equations |
| 3 | wet | | | | | |
| 4 | deck | | Length Hull(s) Overall | set | Lh | set |
| 5 | clearance | | Length Hull (s) waterline | set | LwL | set |
| 6 | | | Length/Beam ratio waterline | set | Lbr | Lbr = LwL /BwL |
| 7 | | | Beam Waterline | | Bwl. | Bwl = LwL/Lbr |
| 8 | | | Beam/draft ratio waterline | set | Btr | Bir: BwL/Tc |
| 9 | Zwd | | Draft below waterline | | Tc | Tc = BwL/Btr |
| 10 | Zwd = .06 LwL | | Draft below waterline Oster | | TcO | TcO = wDispO/2050BwlLwlCpCm |
| 11 | | | Cross Sectional Area | web | CSA | CSA = wed calculator Oster |
| 12 | | | Acceleration | | Acc | Acc = v2 |
| 13 | | | Power required for hull speed | | Pr | Pre = Mss wDispO/Acc |
| 14 | | | Canoe body | set | Cm | set |
| 15 | | | Canoe body calc from Oster disp | | CmO | CmO = wDispO/2050BwlLwlCpTc |
| 16 | | 0.720 | Displacement loaded Oster | web | wDispO | wDispO = web calculator Oster |
| 17 | | 0.674 | Prismatic Coefficient | | Cp | set |
| 18 | | | Speed/Length ratio | | SLR | SLR = v/(sq root LwL) |
| 19 | | | Hull speed | | v | v = SLR (sq root LwL) |
| 20 | | 6.000 | Displacement empty Oster | | dispOe | dispOe = Mss wDispO |
| 21 | | | Carrying Capacity | | CC | CC = .2(wDispO-wDispOe) |
| 22 | | | Beam Overall | | Bh | Bh = Bh1 + Bcb |
| 23 | | | m2 of collectors | set | coil | coll = m2collector |
| 24 | | | Sun Power | | SunP | SunP = .188Coll |
| 25 | | | Power per dome module | | Ppdm | Ppdm = SunP/14 |
| 26 | | | m2 of Sail | set | Sail | sail = m2sail |
| 27 | | | Sail Power | | SailP | SailP = up to .6Pr or SailP = .75sail.3 |
| 28 | | | Power from environment | | Pe | Pe = SunP + SailP |
| 29 | | | % Power from environment | | % Pe | % = 100 Pe/Pr |
| 30 | | 0.746 | Fossil Fuel power | | Pff | 1hp = .75 kw |
| 31 | | 0.674 | % power from fossil fuels | | % Pff | % = 100Pff/Pr |
| 32 | | | Displacement Volume Oster | | $\triangle$boatO | $\triangle$boatO = wDispO/1025 |
| 33 | | | Wetted Surface | | WSA | WSA = 1.7LwLTc + ($\triangle$boatO/Tc) |
| 34 | | | Beam topside | | Bh1 | Bh1 = 1.4xBwL or plans |
| 35 | | | Length/Beam center ratio | | Lbrc | Lbrc = Lh/Bcb |
| 36 | | | Beam between centers | | Bcb | Bcb = Bh-Bh1 |
| 37 | | | Wet deck clearance | | Zwd | Zwd = .06LwL |
| 38 | | | Mass of empty boat factor | | Mss | Mss = .4Tc.62Bwl.95LwlCp/ TcBwlLwlCp |
| 39 | | | | | | |
| 40 | | | | | | |
| 42 | | | | | | |
| 43 | | | | | | |
| 44 | | | | | | |
| 45 | | 0.256 | | | | |
| 46 | | | | | | |
| 47 | | | | | | |
| 48 | | 1.860 | | | | |
| 49 | | | | | | |
| 50 | | | | | | |
| 51 | | | | | | |
| 52 | lots | | | | | |
| 53 | | | | | | |
| 54 | lots | | | | | |
| 55 | lots | | | | | |
| 56 | | | | | | |
| 57 | Zwd | | | | | |
| 58 | Zwd = .06 LwL | | | | | |
| 59 | | | | | | |
| 60 | | | | | | |
| 61 | | 2.211 | | | | |
| 62 | | 0.674 | | | | |
| 63 | | 6.000 | | | | |
| 64 | | | | | | |
| 65 | | | | | | |

The invention claimed is:
1. A multi-hulled aquatic vessel comprising:
a plurality of hulls; and
a dual-walled modular dome spanning the plurality of hulls;
wherein the dual-walled modular dome comprises a plurality of modules, each module including an outer wall and an inner wall, wherein the plurality of modules collectively provide an exoskeleton for the vessel; and
wherein a space between the outer wall and the inner wall of a module of the plurality of modules includes a heat collection system to capture heat from the environment and a rotary engine and alternator to convert thermal energy to electrical energy.

2. The vessel of claim 1, further comprising a channel positioned between adjacent modules of the plurality of modules to collect rainwater.

3. The vessel of claim 1, wherein the inner dome has a radius at least 1.5 times the height of a human occupant of the inner dome.

4. The vessel of claim 1, wherein the dual-walled modular dome is generally hemispherical.

5. The vessel of claim 1, further comprising an electric drive motor in each hull and a battery, wherein the battery is to receive electrical energy from the alternator, and wherein the electric drive motor is to receive electrical energy from the battery.

6. The vessel of claim 1, wherein a module of the plurality of modules is movable with respect to the dual-walled modular dome to provide a sail surface.

7. The vessel of claim 1, wherein a module of the plurality of modules is movable with respect to the dual-walled modular dome to catch wind within the dual-walled modular dome.

8. The vessel of claim 1, wherein the plurality of modules is arranged in a truncated icosahedron pattern that defines the dual-walled modular dome.

9. The vessel of claim 1, wherein a module of the plurality of modules has a planar structure with a perimeter in the shape of a pentagon or hexagon.

10. The vessel of claim 1, wherein the plurality of modules collectively define an interior living space for the vessel, and wherein a module of the plurality of modules is movable with respect to the dual-walled modular dome to provide a door to access the interior living space.

11. The vessel of claim 1, wherein the heat collection system, rotary engine, and alternator are to generate electrical energy by:
increasing temperature and pressure, as expanding gas or liquid goes through the rotary engine to drive the alternator; and
decreasing temperature and pressure or increasing volume, as condensing gas or liquid draws expanding gas or liquid through the rotary engine to drive the alternator.

12. A multi-hulled aquatic vessel comprising:
a plurality of hulls; and
a dual-walled modular dome spanning the plurality of hulls;
wherein the dual-walled modular dome comprises a plurality of modules, each module including an outer wall and an inner wall, wherein the plurality of modules collectively provide an exoskeleton for the vessel; and
wherein a module of the plurality of modules is movable with respect to the dual-walled modular dome to provide a sail surface.

13. A multi-hulled aquatic vessel comprising:
a plurality of hulls; and
a dual-walled modular dome spanning the plurality of hulls;
wherein the dual-walled modular dome comprises a plurality of modules, each module including an outer wall and an inner wall, wherein the plurality of modules collectively provide an exoskeleton for the vessel; and
wherein a module of the plurality of modules is movable with respect to the dual-walled modular dome to catch wind within the dual-walled modular dome.

14. A multi-hulled aquatic vessel comprising:
a plurality of hulls; and
a dual-walled modular dome spanning the plurality of hulls;
wherein the dual-walled modular dome comprises a plurality of modules, each module including an outer wall and an inner wall, wherein the plurality of modules collectively provide an exoskeleton for the vessel; and
wherein the plurality of modules is arranged in a truncated icosahedron pattern that defines the dual-walled modular dome.

15. The vessel of claim 14, wherein:
a first module of the plurality of modules has a planar structure with a perimeter in the shape of a pentagon; and
a second module of the plurality of modules has a planar structure with a perimeter in the shape of a hexagon.

16. A multi-hulled aquatic vessel comprising:
a plurality of hulls; and
a dual-walled modular dome spanning the plurality of hulls;
wherein the dual-walled modular dome comprises a plurality of modules, each module including an outer wall and an inner wall, wherein the plurality of modules collectively provide an exoskeleton for the vessel;
wherein the vessel further comprises a heat collection system, rotary engine, and alternator configured to generate electrical energy by:
increasing temperature and pressure, as expanding gas or liquid goes through the rotary engine to drive the alternator; and
decreasing temperature and pressure or increasing volume, as condensing gas or liquid draws expanding gas or liquid through the rotary engine to drive the alternator.

17. The vessel of claim 16, wherein the gas comprises atmospheric air.

18. The vessel of claim 16, wherein the heat collection system and rotary engine are on a closed loop.

19. A multi-hulled aquatic vessel comprising:
a plurality of hulls; and
a dual-walled modular dome spanning the plurality of hulls;
wherein the dual-walled modular dome comprises a plurality of modules, each module including an outer wall and an inner wall, wherein the plurality of modules collectively provide an exoskeleton for the vessel;
wherein the vessel further comprises a channel positioned between adjacent modules of the plurality of modules to collect rainwater.

* * * * *